(12) United States Patent
Tanabe et al.

(10) Patent No.: US 7,809,180 B2
(45) Date of Patent: Oct. 5, 2010

(54) METHOD OF GENERATING IMAGE OF COMPONENT

(75) Inventors: Atsushi Tanabe, Fukuoka (JP); Shozo Fukuda, Fukuoka (JP); Hirotake Nakayama, Fukuoka (JP)

(73) Assignee: Panasonic Corporation, Osaka (JP)

(*) Notice: Subject to any disclaimer, the term of this patent is extended or adjusted under 35 U.S.C. 154(b) by 1000 days.

(21) Appl. No.: 11/596,115

(22) PCT Filed: Jul. 4, 2005

(86) PCT No.: PCT/JP2005/012700

§ 371 (c)(1),
(2), (4) Date: Nov. 9, 2006

(87) PCT Pub. No.: WO2006/004202

PCT Pub. Date: Jan. 12, 2006

(65) Prior Publication Data
US 2008/0037890 A1    Feb. 14, 2008

(30) Foreign Application Priority Data

| Jul. 5, 2004 | (JP) | ............................. 2004-198593 |
| Jul. 30, 2004 | (JP) | ............................. 2004-224683 |
| Aug. 4, 2004 | (JP) | ............................. 2004-227495 |
| Sep. 16, 2004 | (JP) | ............................. 2004-270382 |

(51) Int. Cl.
*G06K 9/00* (2006.01)
*G06K 9/40* (2006.01)

(52) U.S. Cl. ........................ 382/145; 382/147; 382/254; 382/266

(58) Field of Classification Search ................. 382/254, 382/266, 274, 145, 147, 149, 151, 152
See application file for complete search history.

(56) References Cited

U.S. PATENT DOCUMENTS

| 3,617,626 A | * | 11/1971 | Bluth et al. ..................... 386/4 |
| 4,793,707 A | | 12/1988 | Hata et al. |
| 4,853,970 A | * | 8/1989 | Ott et al. ..................... 382/266 |
| 5,991,039 A | | 11/1999 | Fujishiro et al. |
| 6,005,680 A | * | 12/1999 | Luther et al. ................. 358/2.1 |

(Continued)

FOREIGN PATENT DOCUMENTS

EP    0 231 941    8/1987

(Continued)

OTHER PUBLICATIONS

Pratt W.K.: "*Digital Image Processing—Image Enhancement*", Digital Image Processing, 1991, pp. 263-285 (XP002232860).

(Continued)

*Primary Examiner*—Samir A. Ahmed
*Assistant Examiner*—Li Liu
(74) *Attorney, Agent, or Firm*—Wenderoth, Lind & Ponack, L.L.P.

(57) ABSTRACT

An image generation method for distinguishing a shape of a component includes: a color image taking step (S101) of taking an image of the component in color, and a conversion step (S102, S104) of converting the color image taken in the color image taking step (S101) into a black-and-white grayscale image in which the shape of the component is shown in black-and-white grayscale.

4 Claims, 33 Drawing Sheets

U.S. PATENT DOCUMENTS

| | | | |
|---|---|---|---|
| 6,301,382 B1 * | 10/2001 | Smith et al. | 382/162 |
| 6,377,269 B1 * | 4/2002 | Kay et al. | 345/589 |
| 6,508,553 B2 * | 1/2003 | Gao et al. | 351/227 |
| 6,519,362 B1 * | 2/2003 | Cusmariu | 382/176 |
| 6,614,944 B1 * | 9/2003 | Levantovsky | 382/261 |
| 7,200,259 B1 * | 4/2007 | Gold et al. | 382/149 |
| 7,650,018 B2 * | 1/2010 | Tetsuji | 382/111 |
| 2004/0105032 A1 * | 6/2004 | Kim et al. | 348/607 |
| 2005/0157926 A1 * | 7/2005 | Moravec et al. | 382/173 |

FOREIGN PATENT DOCUMENTS

| | | |
|---|---|---|
| EP | 1 306 801 | 5/2003 |
| JP | 61-147380 | 7/1986 |
| JP | 1-219959 | 9/1989 |
| JP | 6-74714 | 3/1994 |
| JP | 6-243235 | 9/1994 |
| JP | 8-181974 | 7/1996 |
| JP | 10-40380 | 2/1998 |
| JP | 10-208017 | 8/1998 |
| JP | 2001-16459 | 1/2001 |
| JP | 2001-135999 | 5/2001 |
| JP | 2003-224166 | 8/2003 |
| WO | 99/44409 | 9/1999 |

OTHER PUBLICATIONS

Pratt W.K.: "*Digital Image Processing*", 1978, John Wiley & Sons, pp. 330-333 (XP002340498).

Pratt W.K.: "*Digital Image Processing*", 1978, John Wiley & Sons, pp. 736-740 (XP002340499).

Takeshi Agui et al., "*Computer Image Processing*", Sanpo Publications, Inc., Jun. 11, 1979, p. 32, lines 6-12 and Fig. 3-3.

* cited by examiner

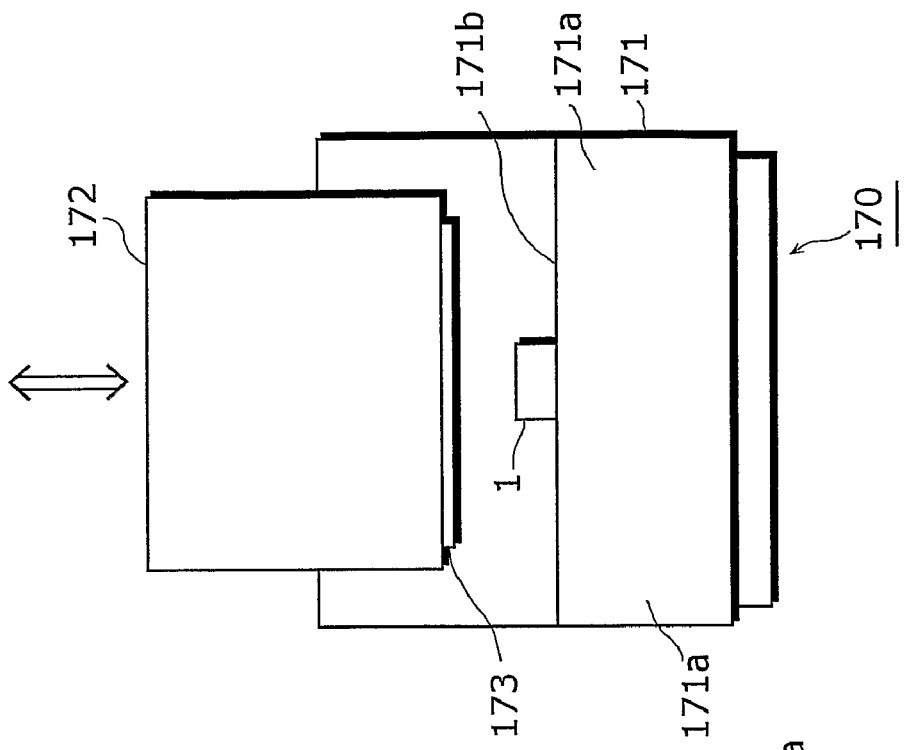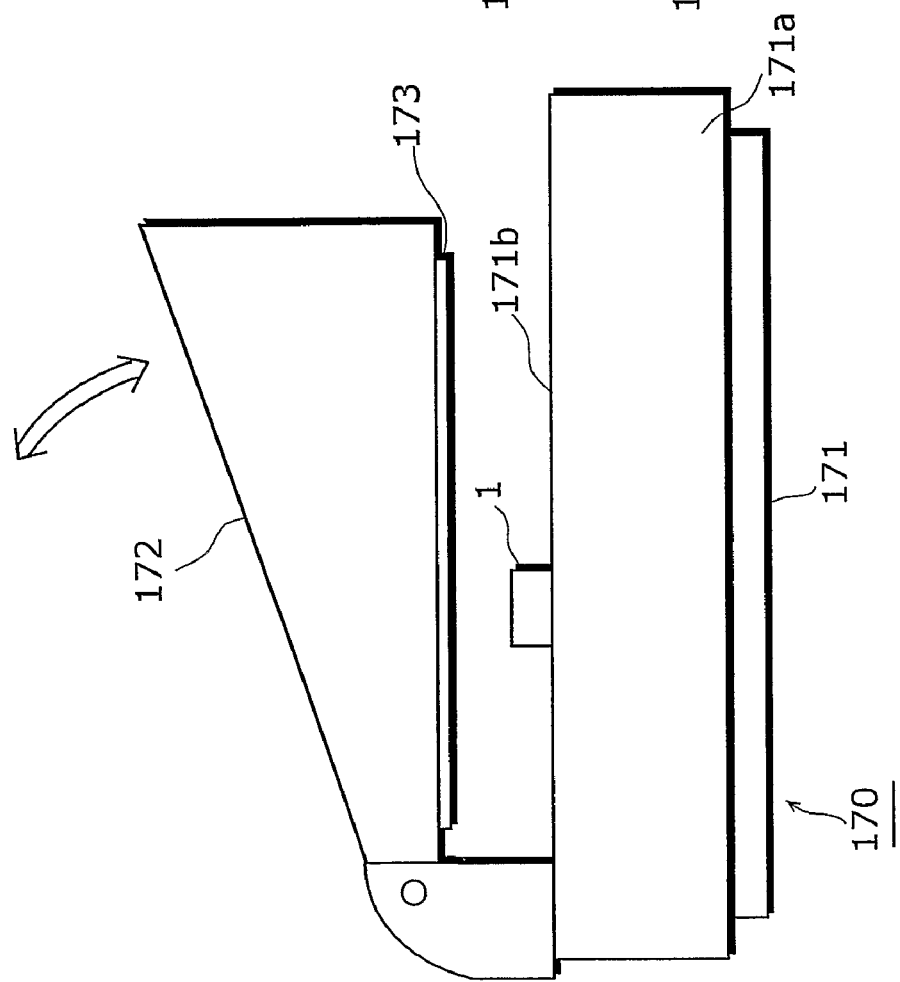

FIG. 19
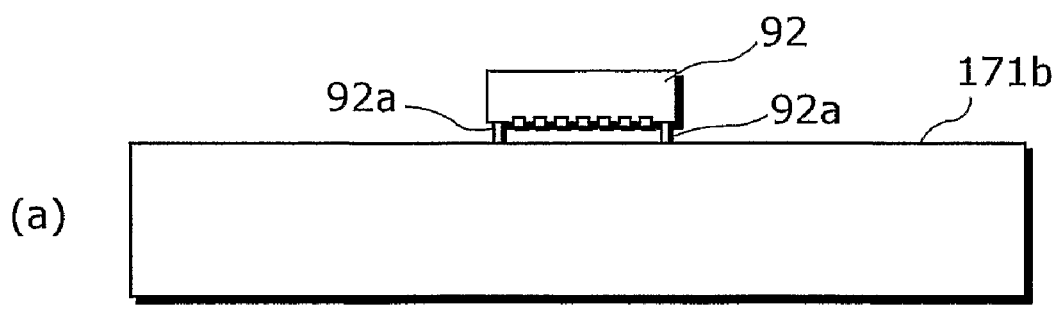
(a)
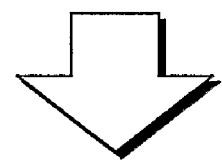
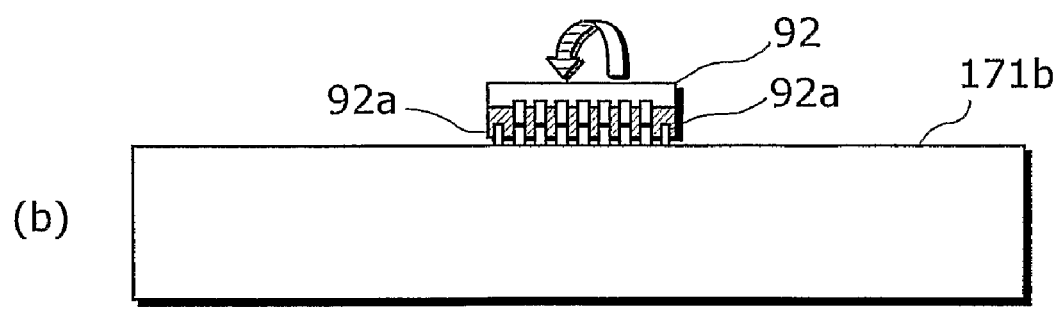
(b)

Please register information necessary for image input.

Component size (maximum side length): ~□4mm

Most common electrode type: Integral type | Select from drawings

Electrode ground plane shape: Flat plane (with edges) | Select from drawings

Determine | Cancel

METHOD OF GENERATING IMAGE OF COMPONENT

TECHNICAL FIELD

The present invention relates to an image generation method of generating an image of a component such as an electronic component, in particular to an image generation method of generating an image used for identifying a characteristic of a component to be mounted on a substrate.

BACKGROUND ART

A method of generating an image of an electronic component has been proposed by taking the image of the electronic component using a black-and-white Charge Coupled Device (CCD) camera in order to recognize an outline, dimension and positional misalignment of the electronic component to be mounted on a substrate (e.g. see Japanese Laid-Open Patent Application No. 10-208017).

The conventional method of generating an image of a component generates an image with a contrast between the component and the background by adjusting colors of lightening which illuminates the component.

However, in the conventional method of generating an image of a component, an image to be generated is simply a black-and-white grayscale image taken with a black-and-white CCD camera. Therefore, a shape of the component is unclear because the contrast between the component and the background and the contrast between an electrode of a component and other parts of the component are unclear.

Accordingly, in order to solve the problem, an object of the present invention is to provide a method of generating an image of a component which clearly distinguishes a shape of the component.

DISCLOSURE OF INVENTION

In order to achieve the objective, a component image generation method of the present invention is a component image generation method of generating an image of a component that is used for identifying a characteristic of the component to be mounted on a substrate, said method comprising: taking an image of the component in color; and converting the color image into a black-and-white grayscale image in which a shape of the component is shown in black-and-white grayscale. Here, in said taking of the color image, the color image of the component may be taken so as to have a background in a monochrome color, and in said converting, the color image may be converted into the black-and-white grayscale image in which an outline of the component is shown in black-and-white grayscale and the background is shown in black or white.

Accordingly, the color image of the component is converted to a black-and-white grayscale image so that the shape of the component in the black-and-white grayscale image can be distinguished by appropriately performing the conversion. Also, with a background in monochrome color, the difference of grayscales between the outline of the component and the background is widened so that the outline of the component in the black-and-white grayscale image can be distinguished. Further, a commonly used scanner can be used for generating the color image of the component and a personal computer and the like can be used for converting the black-and-white grayscale image. Therefore, costs for generating an image can be kept in low without using an imaging device specialized for mounting a component. Furthermore, a black-and-white grayscale image is generated at last so that processing burden can be eased in a process of identifying a characteristic of a component from the image than identifying it from the color image.

The component image generation method may further comprise extending a grayscale range of the black-and-white grayscale image.

Accordingly, the grayscale range of the black-and-white grayscale image is extended so that the outline of the component can be much distinguished by further widening the difference of the grayscales between the outline of the component and the background.

Also, said extending may further include converting, among pixels included in the black-and-white grayscale image, a grayscale value of each pixel that is smaller than a predetermined grayscale value into a minimum grayscale value.

Accordingly, even if the grayscale range of the black-and-white grayscale image is restricted such as in 256 scales of gray, the grayscale range of a valid area of the black-and-white grayscale image can be widened in the restricted range by converting a grayscale value of each pixel that is smaller than the predetermined grayscale value into a minimum value of the 256 scales of gray and discard the grayscale value.

Further, in said taking of the color image, the color image of the component may be taken so as to have the background in blue, and in said converting, the color image may be converted into the black-and-white grayscale image so that the background is shown darker than the component.

For example, in said converting, an RGB value is converted into a black-and-white grayscale value using a conversion formula of $((R+G)/2-B)/2+K$ where R indicates a grayscale value of red, G indicates a grayscale value of green, and B indicates a grayscale value of blue and K indicates a constant K, the RGB value indicating a color of each pixel included in the color image.

Accordingly, the outline of the component that is not bluish can be distinguished in the black-and-white grayscale image.

Further, in said taking of the color image, the color image of the component may be taken so as to have the background in red, and in said converting, the color image may be converted into the black-and-white grayscale image so that the background is shown darker than the component.

For example, in said converting, an RGB value is converted into a black-and-white grayscale value using a conversion formula of $((B+G)/2-R)/2+K$, where R indicates a grayscale value of red, G indicates a grayscale value of green, B indicates a grayscale value of blue and K indicates a constant, the RGB value indicating a color of each pixel included in the color image.

Accordingly, the outline of the component that is not reddish can be distinguished in the black-and-white grayscale image.

Also, the component is an electronic component, and in said converting, the color image may be converted into the black-and-white grayscale image in which an electrode of the component is shown in black-and-white grayscale, by highlighting colors closer to white using the black-and-white grayscale, the colors being included in the color image.

For example, in said taking of the color image, the color image in a Lab colorimetric system is taken, and in said converting, each pixel included in the color image is converted into a black-and-white grayscale value using a conversion formula of $L \times (K-(a^2+b^2)^{1/2})$ which shows, using a constant K, a value L indicating a brightness of the pixel and values a and b indicating a chromaticity.

The electrode of the electronic component shown in the color image is bright achromatic color that is closer to white, and such color image is converted into a black-and-white grayscale image in which colors close to white is more highlighted. Therefore, the outline of the electrode of the electronic component can be distinguished in the black-and-white grayscale image.

Also, the component image generation method may further comprise filtering the black-and-white grayscale image for removing noise.

Accordingly, the noise is removed from the black-and-white grayscale image so that the outline of the electrode of the electronic component can be further distinguished. Further, the influence by the noise can be largely restrained for the relatively small electrode and the characteristic of the electrode can be easily identified.

Also, the component image generation method may further comprise extending a grayscale range of the black-and-white grayscale image.

Accordingly, the grayscale range of the black-and-white grayscale image can be widened. Therefore, the outline of the electrode of the electronic component can be much distinguished by further widening the difference of the grayscales between the electrode of the electronic component, and the other parts including the background.

Also, the component image generation method may further comprise converting a grayscale value, among grayscale values of respective pixels included in the converted black-and-white grayscale image, that is greater than a grayscale value of a pixel corresponding to the electrode into a minimum grayscale value.

For example, in the case where the body of the electronic component is white, in the black-and-white grayscale image, the grayscale values of the body and the electrode are both high, that is, they are closer to white, so that the difference of the grayscales between the body and the electrode becomes small. Also, the electrode of the electrode component shown in the color image is shown in color darker than white. Therefore, in the case where the body of the electronic component is white, the grayscale value of a pixel corresponding to a body of the black-and-white grayscale image becomes a little greater than the grayscale value of the pixel corresponding to the electrode. Thus, even if the body of the electronic component is white, the body is shown in black in the black-and-white gray scale image and only the electrode can be shown in white by converting the grayscale value that is greater than the grayscale value corresponding to the electrode into a minimum grayscale value. Accordingly, even if the color of parts other than electrode of the electronic component is white, only the outline of the electrode of the electronic component can be distinguished.

Further, in said taking of the color image, a first color image of the component may be taken so as to have a background in a first monochrome color, and in said converting, the first color image may be converted into the black-and-white grayscale image in which the background is shown in black or white and an outline of the component is shown in black-and-white grayscale, said component image generation method may further comprise: judging whether or not a contrast between the component and background in the black-and-white grayscale image satisfies a predetermined standard; taking a second color image of the component so as to have the background in a second monochrome color that is different from the first monochrome color, in the case where it is judged that the contrast does not satisfy the standard; and converting the second color image into a black-and-white grayscale image in which the background is shown in black or white and the outline of the component is shown in black-and-white grayscale. For example, one of the first monochrome color and the second monochrome color is blue and the other is red.

Accordingly, the color image of the component with the first monochrome color background is converted into the black-and-white grayscale image so that, by effectively using the first monochrome color, the outline of the component in the black-and-white grayscale image can be distinguished by widening the difference of the grayscales between the outline of the component and the background. Also, even if the contrast in the first converted black-and-white grayscale image is insufficient, the black-and-white grayscale image is generated again by changing the color of the background to the second monochrome color. Therefore, the outline of the component can be surely distinguished in the black-and-white grayscale image.

Further, said judging may include calculating, for each unit area of the black-and-white grayscale image, a sum of black-and-white grayscale values indicated by respective pixels included in a unit area, and judging that the contrast satisfies the predetermined standard when the calculated sum of the grayscale values in each unit area is equivalent to or greater than a threshold.

Accordingly, it can be judged easily about whether or not the contrast satisfies a certain standard.

Also, the component image generation method may further extending the grayscale range of the first converted black-and-white grayscale image in the case where it is judged that the contrast satisfies the standard; and extending the grayscale range of the second converted black-and-white grayscale image in the case where it is judged that the contrast does not satisfy the standard.

Accordingly, the grayscale range of the black-and-white grayscale image is widened so that the outline of the component can be much distinguished by further widening the difference between the outline of the component and the grayscale.

Here, a component automatic teaching apparatus according to the present invention is the component teaching apparatus which generates component teaching data indicating a characteristic of a component to be mounted on a substrate, said apparatus comprising: a color image taking unit operable to take an image of the component in color; a conversion unit operable to convert the color image taken by said color image taking unit into a black-and-white grayscale image in which a shape of the component is shown in black-and-white grayscale, and a data generation unit operable to identify a characteristic of the component from the black-and-white grayscale image, and generate component teaching data indicating the characteristic. Here, said color image taking unit may include: an irradiating unit operable to irradiate a periphery of the component with a single-color light from an opposite side, seen from the component, of a light-transmitting plate which transmits light, the periphery including the component mounted on the light-transmitting plate; and an imaging unit operable to take the image of the component in color through the light-transmitting plate in a state where said irradiating unit irradiates light.

Accordingly, the plane faces the light-transmitting plate of the component is taken for the image in a state where a single-color light is irradiated from the back including the periphery of the component so that the background of the component shown in the color image can be shown in even and vivid monochrome color despite the thickness of the component. Consequently, the component teaching data precisely indicating the shape can be generated by identifying the shape of the component from the color image without mistakes.

Also, the component automatic teaching apparatus may further comprise a holding unit operable to hold the component so that a predetermined plane of the component faces the light-transmitting plate. For example, said holding unit has a nozzle, and is operable to hold the component by sucking the component to a tip of the nozzle.

Accordingly, the plane such as an electrode plane of the component is fixed so as to face the light-transmitting plate so that the image of the electrode plane can be taken without distortion. Consequently, the component teaching data which indicates the shape of the component more precisely can be generated.

Further, said irradiating unit may operable to irradiate the single-color light by emitting light evenly over a plane. For example, said irradiating unit operable to irradiate one of blue light and red light.

Accordingly, the background of the component shown in the color image can be shown in vivid blue or red further evenly so that the component teaching data indicating the shape of the component more precisely can be generated.

Further, said irradiating unit may have a light source which emits one of blue light and read light, and a diffusion plate which diffuses the light emitted from said light source evenly over a plane. For example, said light source has light-emitting diodes arranged evenly over a plane.

Accordingly, the light emitted from the light source diffuses along a plane of the diffusion plate so that the diffused blue or red light can be irradiated evenly to the component and the periphery of the component. Consequently, the component teaching data indicating the shape of the component more precisely can be generated.

Further, said light-emitting diodes may include first light-emitting diodes which emit blue light and second light-emitting diodes which emit red light, said first and second light-emitting diodes being arranged evenly over a plane, and said light source may supply power alternately to between the first light-emitting diodes and the second light-emitting diodes.

Accordingly, when power is supplied to the first light-emitting diodes, the light source emits blue light over the plane, and it emits red light over the plane when power is supplied to the second light-emitting diodes, so that color of light to be irradiated toward the component and its periphery can be changed easily without changing the structure of the component automatic teaching apparatus. Consequently, the component teaching data indicating the shape of the component precisely despite of its color can be generated by changing the color of light irradiated according to the color of the component whose image is to be captured so as to irradiate blue light if the component whose image is to be captured is not bluish and to irradiate red light if the component whose image is to be captured is not reddish.

Also, the component automatic teaching apparatus may further comprise a clearance adjusting unit operable to adjust a clearance between said irradiating unit and said light-transmitting plate.

Accordingly, a component of an arbitral thickness is mounted on the light-transmitting plate and the single-color light can be irradiated by adjusting the clearance between the irradiating unit and the light-transmitting plate.

It should be noted that the present invention can be also realized as a component teaching data generation method of generating the component teaching data using the component image generation method, a program corresponding to the method and as a recording medium in which the program is stored. Further, the present invention can be realized as an image generation method of generating an image using the component image generation method. Furthermore, the present invention can be realized as a component mounting apparatus having the component automatic teaching apparatus.

FURTHER INFORMATION ABOUT TECHNICAL BACKGROUND TO THIS APPLICATION

The disclosures of following Japanese Patent Applications including specification, drawings and claims are incorporated herein by reference in its entirety: the Japanese Patent Application No. 2004-198593 filed on Jul. 5, 2004; the Japanese Patent Application No. 2004-224683 filed on Jul. 30, 2004; the Japanese Patent Application No. 2004-227495 filed on Aug. 4, 2004; and the Japanese Patent Application No. 2004-270382 filed on Sep. 16, 2004.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 2A and FIG. 2B are drawings showing an external view of a scanner according to the first embodiment of the present invention;

FIG. 19 is a diagram for explaining a state where the component cannot be fixed in a correct state;

FIG. 34 is a screen display diagram showing an example of a screen to be displayed by a displaying unit for determining a generation condition by the image processing unit according to the variation of the first embodiment.

BEST MODE FOR CARRYING OUT THE INVENTION

First Embodiment

Hereafter, it is described about a component automatic teaching apparatus according to the first embodiment of the present invention with references to the drawings.

Figure 1:
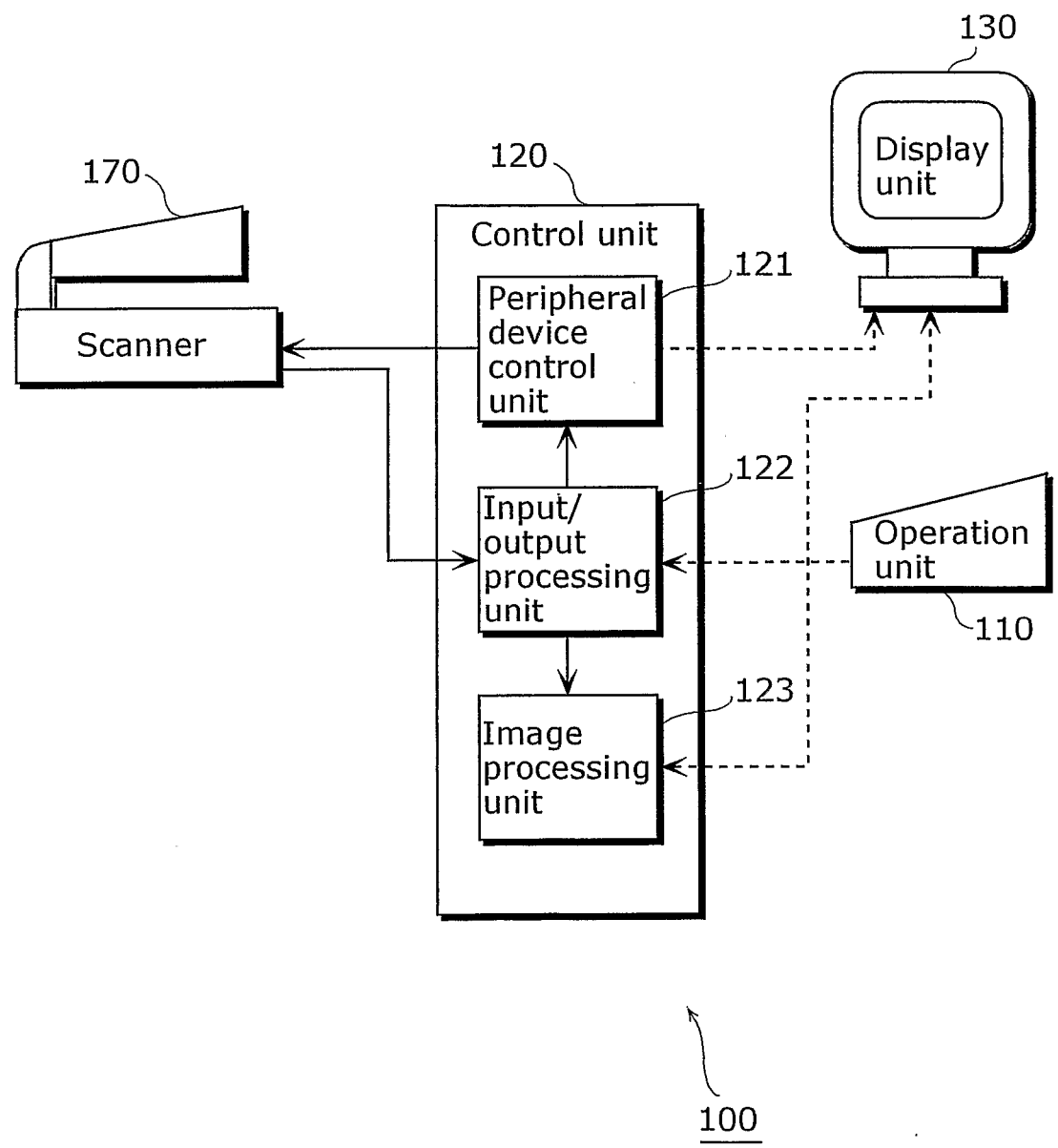
FIG. 1 is a diagram showing a structure of a component automatic teaching apparatus according to a first embodiment of the present invention.

FIG. 1 is a diagram showing a structure of the component automatic teaching apparatus according to the first embodiment of the present invention.

A component automatic teaching apparatus 100 generates component teaching data which indicates a shape of a component and a characteristic dimension using an image generation method of an electronic component (hereafter simply referred to as component) of the present invention. It includes a scanner 170 which takes an image of a component, an operation unit 110 which receives an operation made by an operator, a display unit 130 which is made up of, for example, a liquid crystal display and the like, and a control unit 120 which controls the scanner 170 and the display unit 130 based on the operation received by the operation unit 110. Also, the control unit 120 has a peripheral device control unit 121 and an input/output processing unit 122, and an image processing unit 123.

FIG. 2A and FIG. 2B are external drawings showing an external view of the scanner 170.

As shown in FIG. 2A and FIG. 2B, the scanner 170 is made up of a scanner body 171, a cover 172 and a cover sheet 173.

The scanner body 171 has a cabinet 171a nearly in a rectangular box shape, an imaging device and lightening device embodied in the cabinet 171, and a glass plate 171b attached to the top surface of the cabinet 171a.

The cover 172 is placed on the cabinet 171a of the scanner body 171 in a freely rotatable way. When an operator places a component 1 on the scanner 170, the cover 172 is removed (opened) from the glass plate 171b of the scanner body 171. When the operator takes an image of the component 1, the cover 172 is set to cover (closed) the glass plate 101 of the scanner body 171.

The cover sheet 173 is attached on the side facing the glass plate 171b of the cover 172. Also, the color of the cover sheet 173 is blue or red and the blue cover sheet 173 and the red cover sheet 173 are alternatively used depending on a color of the component 1 whose image is to be taken.

When the image of the component 1 is taken, the operator first judges whether the color of the component 1 is bluish or reddish. If the color is not bluish, the cover 172 is opened and the blue cover sheet 173 is attached to the cover 172. The operator then places the component 1 on the glass plate 171b and closes the cover 172. In such state, the scanner 170 generates a color image of the component 1 with a blue background by lightening the component placed on the glass plate 171b with the lightening device of the scanner body 171, and taking an image of the component 1 in color while moving the imaging device. On the other hand, if the component 1 to be scanned is not reddish, the operator attaches the red cover sheet 173 similarly to the cover 172 and places the components 1 on the glass plate 171b. In such state, the scanner 170 takes an image of the component 1 in color with a red background. Thus, a color image of the component 1 which has a monochrome colored background either in blue or red is generated.

The input/output processing unit 122 of the control unit 120 obtains an operation details received by the operation unit 110, and outputs the operation details to the peripheral device control unit 121 and the image processing unit 123. Also, the input/output processing unit 122 obtains the color image taken by the scanner 170, and outputs the color image to the image processing unit 123.

The peripheral device control unit 121 obtains the operation details received by the operation unit 110 via the input/output processing unit 122, and controls the scanner 170 and the display unit 130 based on the operation details.

The image processing unit 123 performs a predetermined processing on the color image of the component taken by the scanner 170, generates a black-and-white image in which the outline of the component and the like is shown in black-and-white grayscale, and makes the display unit 130 display the black-and-white grayscale image.

Specifically, the image processing unit 123 generates i) a black-and-white grayscale image of a component outline for specifying an outline of the component (hereafter referred to as component black-and-white image) and ii) a black-and-white grayscale image of an electrode outline for specifying an outline of an electrode of the component (hereafter referred to as electrode black-and-white image). The component black-and-white image indicates the outline of the component in black-and-white grayscale and the electrode black-and-white image indicates the outline of the electrode in black-and-white grayscale, in which the electrode is shown in white and parts of the component other than the electrode and background is shown in black.

Also, the image processing unit 123 obtains the operation details received by the operation unit 110 via the input/output processing unit 122, and determines a generation condition for generating component teaching data which indicates the outline of the component and the characteristic dimension based on the operation details. The image processing unit 123 then generates the component teaching data from the black-and-white grayscale image and the generation condition.

The generation condition is, for example, an electrode type of the component, a shape of a ground plane of the electrode (hereafter referred to as electrode ground plane shape), and the like. The operator operates the operation unit 110 following the screen displayed on the display unit 130 based on the control by the control unit 120, and inputs the electrode type and the electrode ground plane shape.

Figure 3A:
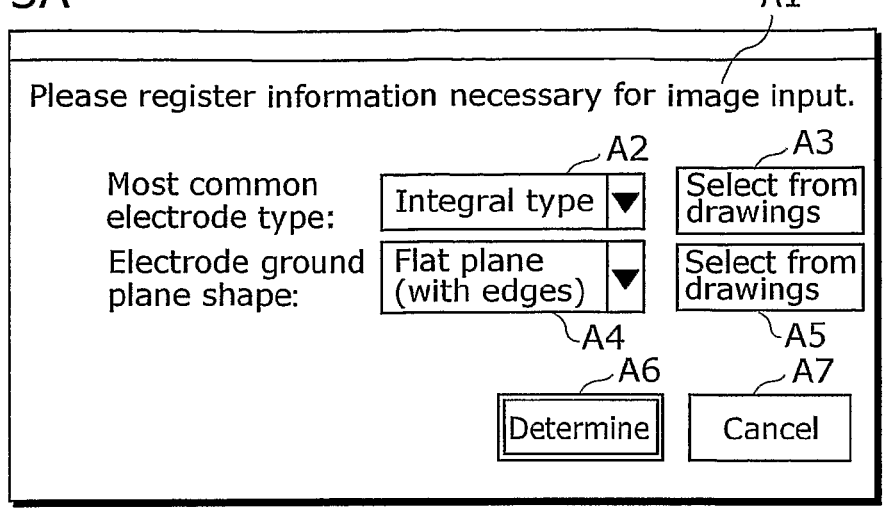
FIG. 3A, FIG. 3B and FIG. 3C are screen display diagrams showing examples of a screen to be displayed by a displaying unit for determining a generation condition by an image processing unit according to the first embodiment of the present invention.
Figure 3B:
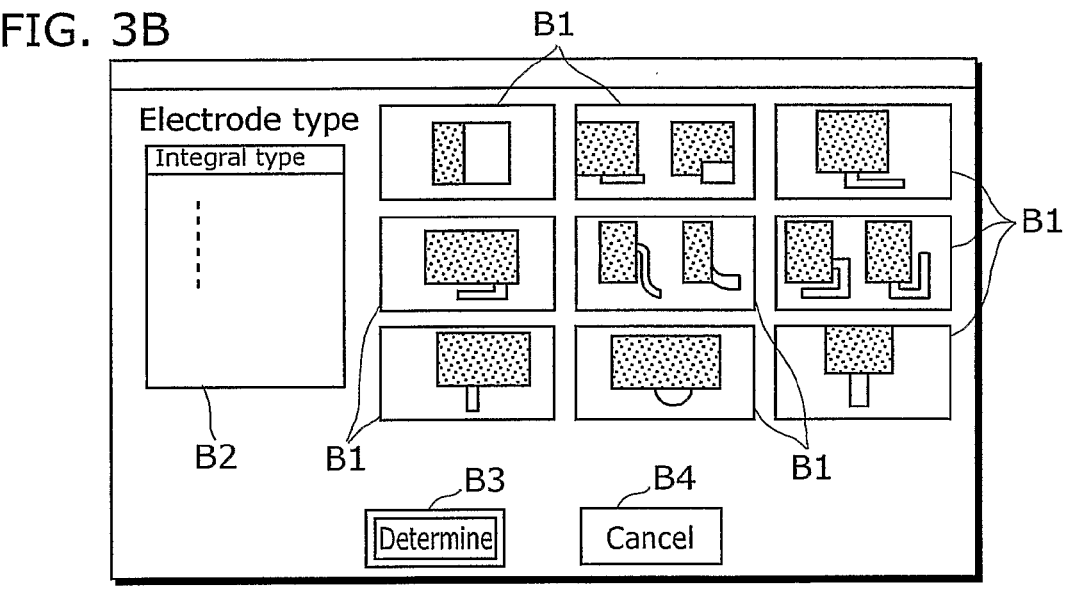

FIG. 3A and FIG. 3B are screen display diagrams, each of which shows an example of a screen which the image processing unit 123 makes the display unit 130 to display for determining the generation condition.

As shown in FIG. 3A, the image processing unit 123 makes the display unit 130 display the followings: a message A1 such as "please register information necessary for image input"; an electrode type column A2 for displaying a name of the electrode type by selecting from a pull-down menu; an electrode type selection button A3 for selecting the electrode type from drawings; a plane shape column A4 for displaying a name of the electrode ground plane shape by selecting from a pull-down menu; a plane shape selection button for selecting the electrode ground plane shape from the drawings; a determination button A6 which pursues to determine a generation condition with the contents displayed in the electrode type column A2 and the plane shape column A4; and a cancel button A7 which pursues to cancel the determination of the generation condition.

When the screen shown in FIG. 3A is displayed, the operator operates the operation unit 110 to display the electrode type of the most common components in the electrode type column A2 directly or indirectly using the electrode type selection button A3.

When the electrode type is indirectly displayed, the operator selects the electrode type selection button A3. As the result of selection, the display unit 130, as shown in FIG. 3B, displays the following: drawing buttons B1 showing drawings of, for example, 9 electrode types; a name column B2 showing names of the 9 electrode types as a list format; a determination button B3 for pursuing to determine the selected electrode type shown by the drawing button B1; and a type cancel button B4 for pursuing to cancel selecting the electrode type using a drawing. Here, the operator finds a drawing showing an electrode type of a component out of the drawings shown by the 9 drawing buttons B1, and selects the drawing button B1 showing the drawing by operating the operation unit 110. When the drawing button B1 is selected, a name of the electrode type shown by the selected drawing button B1 out of each names displayed on the name column B2 is reversed on the display. Next, if the operator selects the type determination button B3 by operating the operation unit 110, the display unit 130 displays the screen shown in FIG. 3A again. In the electrode type column A2 on the screen shows the name of the electrode type shown by the selected drawing button B1. Thus, the operator can easily input the name from the drawing using the electrode type selection button A3 even if he/she does not know the name of the electrode type of the component.

Also, when the screen shown in FIG. 3A is displayed, the operator directly displays the electrode ground plane shape of the component in the plane shape column A4, or indirectly displays it using the plane shape selection button A5.

Figure 3C:
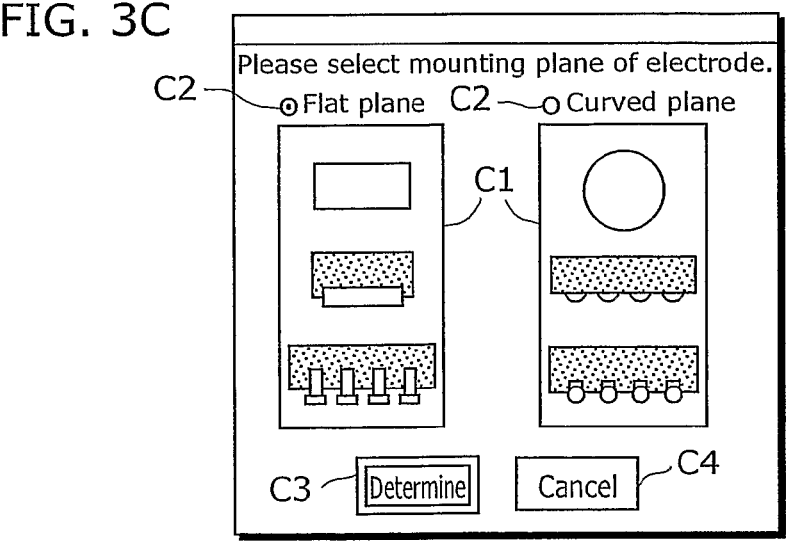

When the electrode ground plane shape is indirectly displayed, the operator selects the plane shape selection button A5. Consequently, the display unit 130, as shown in FIG. 3C, displays the following: drawings C1 showing, for example, two electrode ground plane shapes; check boxes C2 respectively corresponding to the drawings C1; a plane shape determination button C3 for pursuing to determine a electrode ground plane shape corresponding to the checked check box C2; and a plane shape cancel button C4 for pursuing to cancel selecting the electrode ground plane shape using drawings. Here, the operator finds, a drawing showing an electrode ground plane shape of the component out of the two drawings C1, and checks the check box C2 corresponding to the drawing by operating the operation unit 110 (enter black dot). Next, when the operator selects the plane shape determination button C3 by operating the operation unit 110, the display unit 130 displays the screen shown in FIG. 3A again. In the plane shape column A4 on the screen, the name of the electrode ground plane shape corresponding to the checked check box C2. Thus, the operator can easily input the name from the drawing even if he/she does not know the name of the electrode ground plane shape of the component.

Thus, when the operator selects the determination button A6 in a state where the names of the electrode type and electrode ground plane shape are selected and respectively displayed in the electrode type column A2 and the plane shape column A4 on the screen shown in FIG. 3A, the selected and displayed names of the electrode type and the electrode ground plane shape are determined as conditions for generating the component teaching data.

The image processing unit 123 specifies an algorithm showing an area of the component to be dimensionally measured and a measurement processing method thereof from the determined generation conditions and the black-and-white grayscale image. The image processing unit 123 then measures a dimension of the area of the component, that is the characteristic dimension, from the black-and-white grayscale image using the algorithm, and generates the component teaching data indicating the characteristic dimension and the shape of the component. The image processing unit 123 also makes the display unit 130 display the component teaching data.

Such component teaching data is used for recognizing a positional misalignment of a component in the component mounting apparatus which mounts the component on a substrate. In other words, when mounting the component on the substrate, the component mounting apparatus sucks the component using a head, transfers the component to a predetermined area on the substrate, and mounts the component in the area. Here, a camera takes an image of the component sucked by the head while the component is being transferred. The component mounting apparatus then recognizes a positional misalignment of the component from the imaging result and the component teaching data, and drives the header and the like so as to resolve the positional misalignment. Accordingly, it can mount the component precisely in the predetermined area on the substrate.

Figure 4:
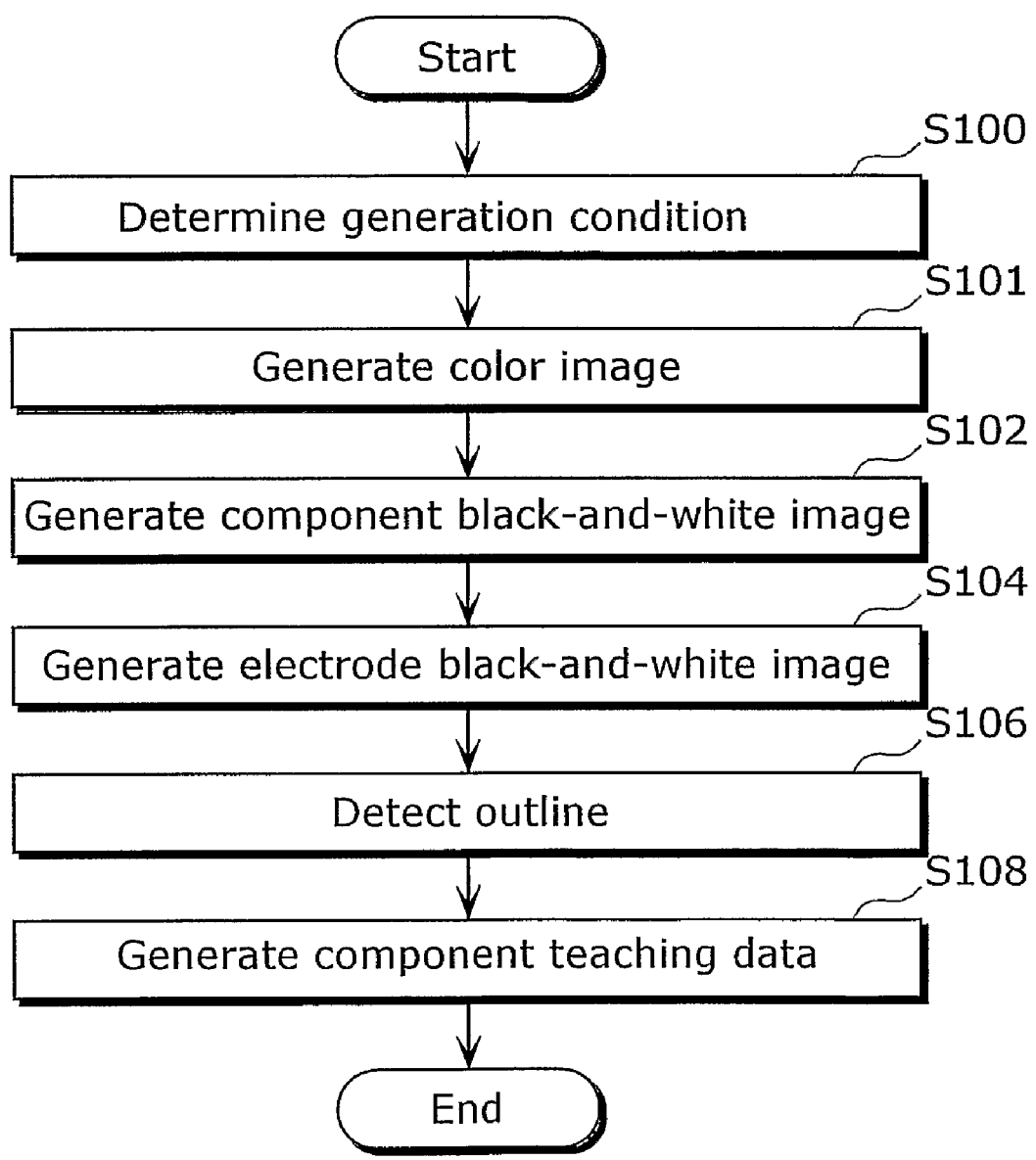
FIG. 4 is a flowchart showing an overall operation of the component automatic teaching apparatus according to the first embodiment of the present invention.

FIG. 4 is a flowchart showing an overall operation of the component automatic teaching apparatus 100.

The component automatic teaching apparatus 100 first determines a generation condition based on the operation made by the operator (step S100).

The component automatic teaching apparatus 100 then takes an image of the component in color (step S101), generates a component black-and-white image from the color image (step S102), and generates an electrode black-and-white image from the color image (step S104). That is to say, in the steps S102 and S104, the component automatic teaching apparatus 100 converts the color image of the component into a black-and-white grayscale image which shows a shape of the component in black-and-white grayscale.

The component automatic teaching apparatus 100 then detects an outline of the component and an outline of an electrode of the component from the component black-and-white image and the electrode black-and-white image (step S106). Such detections of outlines are detected from the difference of the black-and-white grayscale values. Herein, the component automatic teaching apparatus 100 also specifies a predetermined algorithm with references to the generation condition determined in step S100 and the like.

Lastly, the component automatic teaching apparatus 100 measures the characteristic dimension of the component from the detected outlines of the component and electrode using the predetermined algorithm, and generates the component teaching data showing the measurement result (step S108).

Here, it is described in detail about a generation method of the component black-and-white image using the chroma key technology in the step S102.

Figure 5:
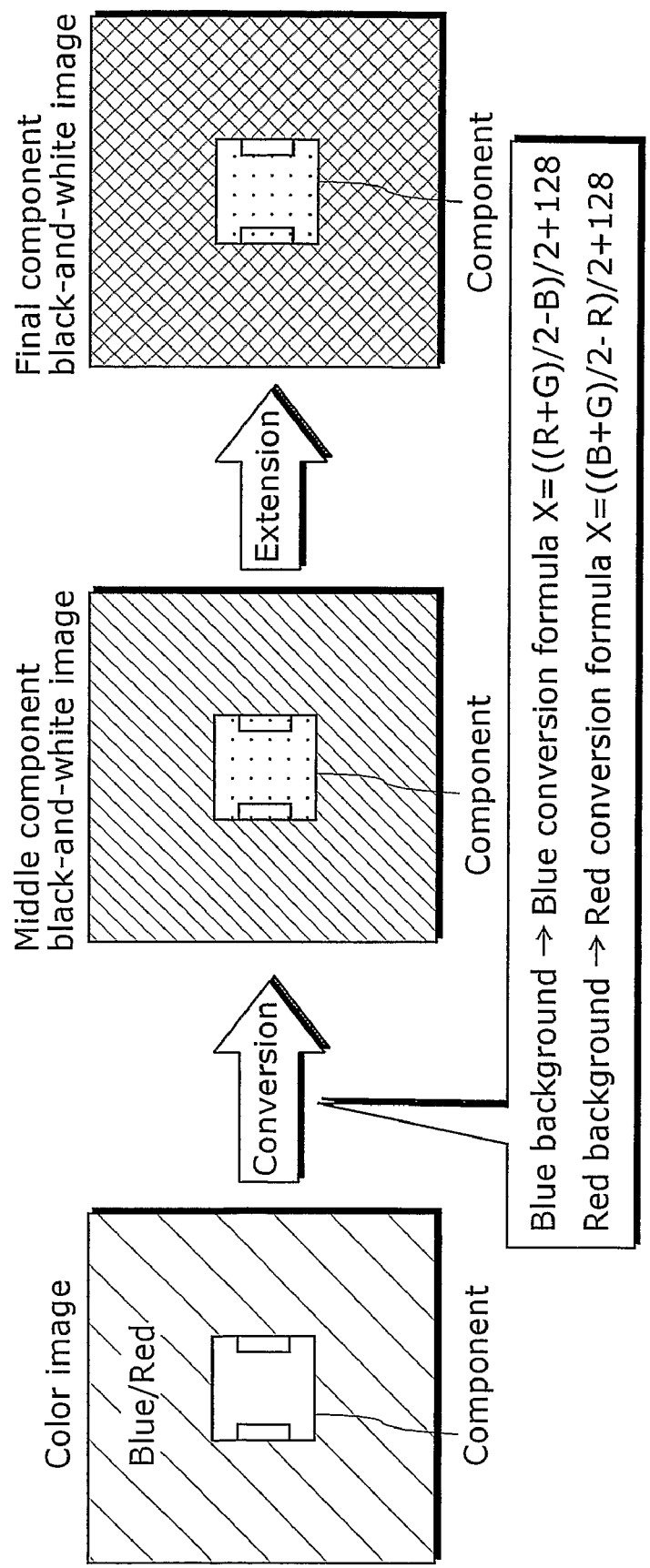
FIG. 5 is a diagram for explaining a generation method of a component black-and-white image according to the first embodiment of the present invention.

FIG. 5 is a diagram for explaining the generation method of the component black-and-white image according to the present embodiment.

The image processing unit 123 obtains a color image of the component from the scanner 170, and generates a component black-and-white image showing the component in white and the background in black from the color image with blue or red background. The image processing unit 123 then strengthens a contrast between the component and the background by performing extension processing on the component black-and-white image. Here, the component black-and-white image generated at first from the color image is called middle component black-and-white image and the component black-and-white image generated after the extension is called final component black-and-white image.

Specifically, when the image processing unit 123 generates the middle component black-and-white image from the color image, it converts, for each pixel, the grayscale value of RGB (RGB value) having, for example, 256 levels of gray into the black-and-white grayscale value having 256 levels of gray.

When the image processing unit 123 recognizes that the background of the color image is blue, the RGB value indicated by each pixel of the color image is converted into the grayscale value of red having 256 levels of gray using a blue conversion formula that is $X=((R+G)/2-B)/2+128)$. Here, R indicates a grayscale value of red having 256 levels of gray, G indicates a grayscale value of green having 256 levels of gray, and B indicates a grayscale value of blue having 256 levels of gray. Also, $(R+G)/2-B$ indicates a degree of blue in each pixel, and the value decrease as the blue level is high. Further, the pixel whose grayscale value X is greater is shown whiter, while the pixel whose grayscale value X is smaller is shown darker in black.

For example, in the case where the pixel included in the color image is yellow, the RGB value of the pixel is (255, 255, 0) so that the image processing unit 123 converts the RGB value (255, 255, 0) into a black-and-white grayscale value shown as $X=((255+255)/2-0)/2+128=255$. Also, in the case where the pixel included in the color image is green, the RGB value of the pixel is (0, 255, 0) so that the image processing unit 123 converts the RGB value into a black-and-white grayscale value shown as $X=((0+255)/2-0)/2+128=192$. Similarly, in the case where the pixel included in the color image is white, the RGB value of the pixel is (255, 255, 255) so that the image processing unit 123 converts the RGB value of the pixel into a black-and-white grayscale value shown as $X=128$. Further, in the case where the pixel in the color image is navy, the imaging processing unit 123 converts the RGB value of the pixel (0, 0, 160) into a black-and-white grayscale value shown as $X=48$. In the case where the pixel in the color image is blue, it converts the RGB value of the pixel (0, 0, 255) into a black-and-white grayscale value shown as $X=0$.

Furthermore, when the image processing unit 123 recognizes that the background of the color image is red, it converts the RGB value of each pixel of the color image into a black-and white grayscale value X that has 256 levels of gray using a red conversion formula of $(X=((B+G)/2-R)/2+128)$. Here, $(B+G)/2-R$ indicates a degree of red in each pixel, and the value decrease as the red level is higher. Further, similar to the above, the pixel whose grayscale value X is larger is shown whiter, while the pixel whose grayscale value X is smaller is shown darker in black.

Thus, a middle component black-and-white image is generated for a component that is not bluish from the color image with blue background using the blue conversion formula. On the other hand, a middle component black-and-white image is generated for a component that is not reddish from the color image with red background using the red conversion formula. Therefore, the contrast between the component and the background can be strengthened.

When the extension processing is performed, the image processing unit 123 then retrieves a grayscale value as a basis which characterizes the distinction of black and white (hereafter referred to as reference grayscale value) and the maximum value of the grayscale value (hereafter referred to as maximum grayscale value) out of the grayscale values of pixels included in the middle component black-and-white image. The image processing unit 123 then extends the range from the reference grayscale value to the maximum grayscale value to the range from 0 to 255.

Figure 6:
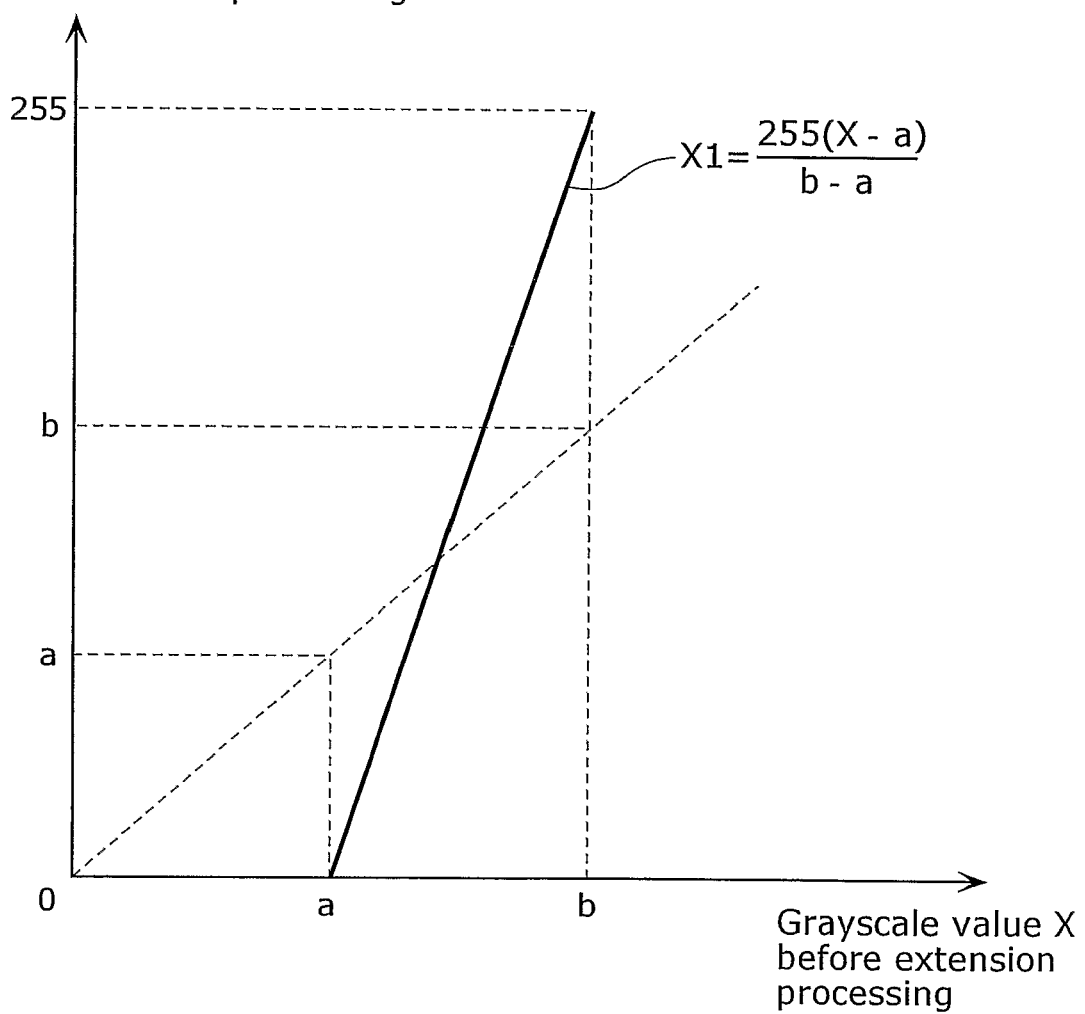
FIG. 6 is a diagram for explaining an example of an extension processing according to the first embodiment of the present invention.

FIG. 6 is a diagram for explaining an example of the extension process.

When the image processing unit 123 finds the reference grayscale value a and the maximum grayscale value b out of the grayscale values of pixels included in the middle component black-and-white image, it extends the range of the grayscale values from a to b to the range from 0 to 255.

Specifically, the image processing unit 123 converts, for each pixel, the grayscale value X that is equivalent to or more the reference grayscale value a before the extension processing is performed on the middle component black-and-white image, into the grayscale value X1 after the extension processing shown as X1=255(X−a)/(b−a), and converts the grayscale value X that is smaller than the reference grayscale value a into the grayscale value X1 shown as X1=0 (the minimum value of 256 levels of gray).

Through the extension processing, the contrast between the component and the background can be further strengthened.

Here, the reference grayscale value a is retrieved using a histogram of grayscale values.

Figure 7:
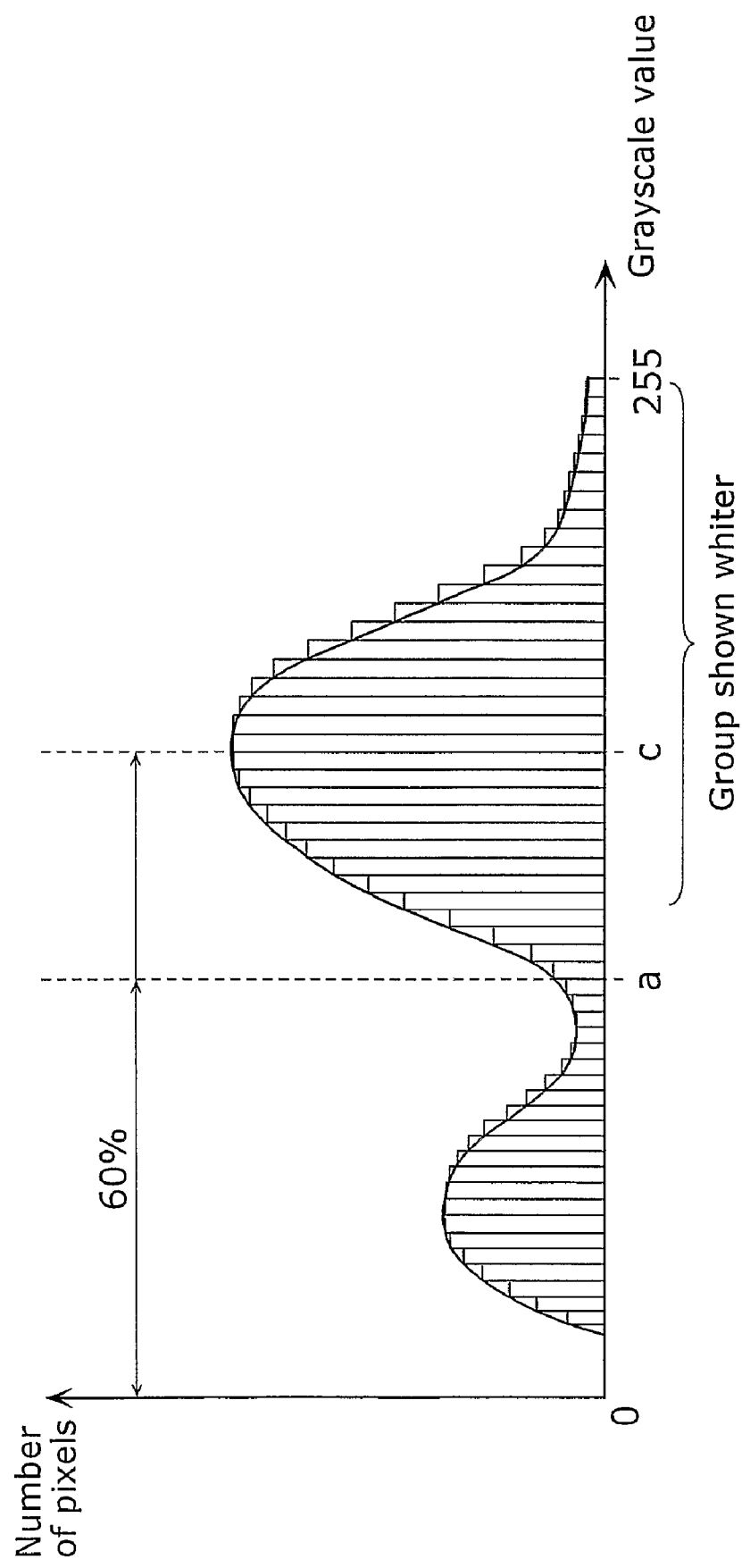
FIG. 7 is a diagram for explaining a method of retrieving a reference grayscale value according to the first embodiment of the present invention.

FIG. 7 is a diagram for explaining a method of retrieving the reference grayscale value a.

The image processing unit 123 generates a histogram showing the number of pixels corresponding to respective grayscale values in the middle component black and white image. The image processing unit 123 which has generated the histogram specifies a grayscale value c that has the largest number of pixels from a group of having high grayscale values of the histogram that is a group where white is strong. The image processing unit 123 then determines, for example, 60 percent of the grayscale value c as the reference grayscale value a.

Accordingly, in the present embodiment, the outline of the component can be more distinguished by widening the gap of grayscales between the outline of the component and the background in order to extend the grayscale range of the middle component black-and-white image. Also, the grayscale values that are less than the reference grayscale value a out of the grayscale values of pixels in the middle component black-and-white image are all set to 0. Therefore, even there is a limit in the range of grayscale values that is 256 scales of gray, the grayscale range in an effective area of the middle component black-and-white image can be extended in the limited range.

Figure 8:
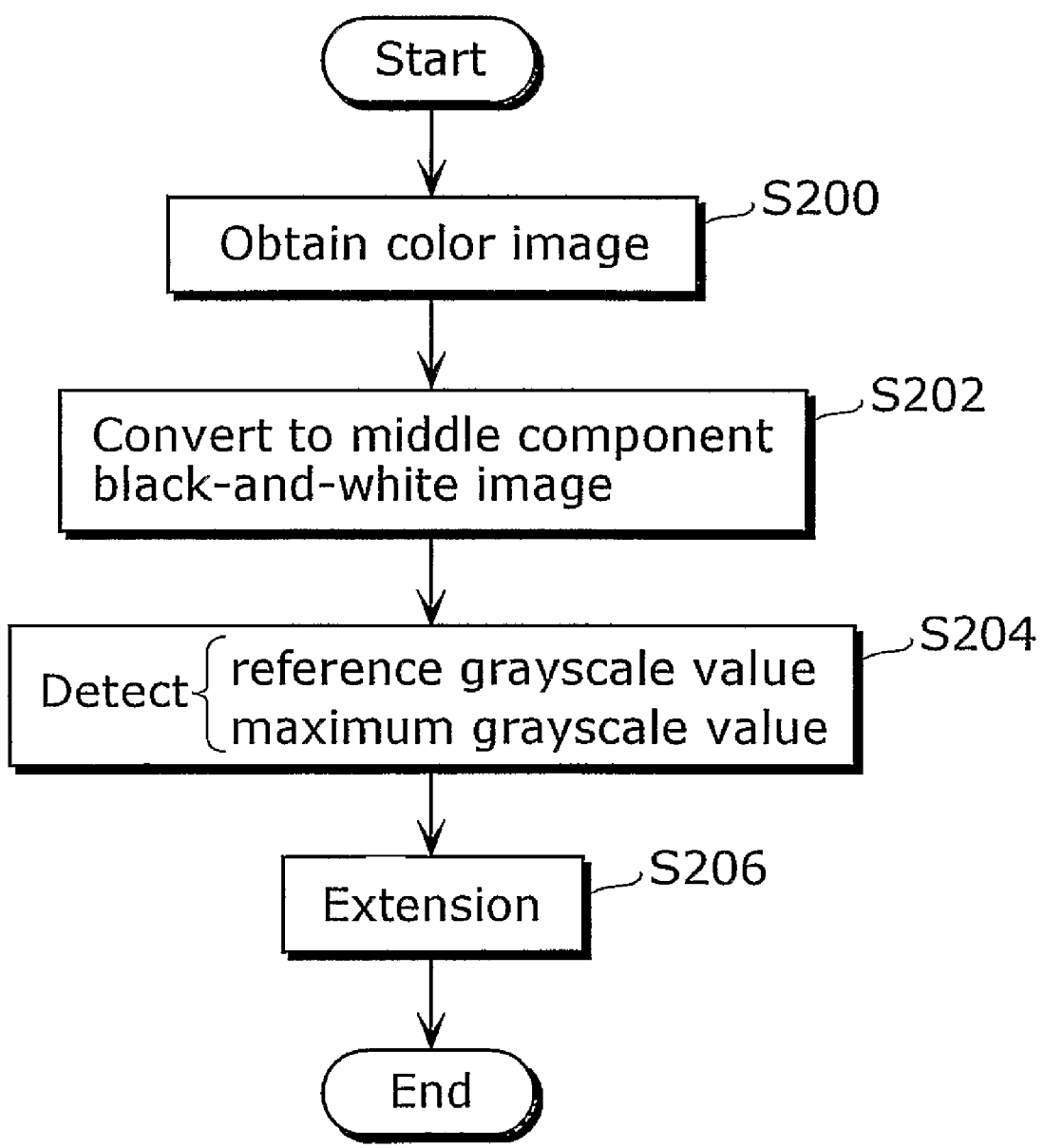
FIG. 8 is a flowchart showing an operation of generating a final component black-and-white image of a component by the image processing unit according to the first embodiment of the present invention.

FIG. 8 is flowchart showing an operation (the operation of step S102 in FIG. 4) of the image processing unit 123 to generate the final component black-and-white image of the component.

The image processing unit 123 first obtains a color image from the scanner 170 (step S200), and converts the color image into a middle component black-and-white image (step S202). Next, the image processing unit 123 retrieves the reference grayscale value a and the maximum grayscale value b from the middle component black-and-white image (step S204), and performs extension processing on the middle component black-and-white image using the reference grayscale value a and the maximum grayscale value b (step S206). As the result, a final component black-and-white image with high contrast is generated.

Accordingly, in the present embodiment, the color image of the component with blue or red background is converted into the compound black-and-white image so that the outline of the component in the component black-and-white image can be distinguished by widening the gap of grayscales between the outline of the component and the background using the blue or red conversion formula that are focused on the color of the background. Further, in the present embodiment, the scanner 170 can be replaced to a scanner that is commercially manufactured and the control unit 120, the operation unit 110 and the display unit 130 can be replaced to a personal computer. Therefore, the cost for image generation can be reduced. Further, the component automatic teaching apparatus 100 in the present embodiment detects the outline from the final component black-and-white image and measures the dimension of the component from the outline. Therefore, compared to the case where the outline is detected directly from the color image, the burden on the processing of measuring a dimension can be reduced.

It should be noted that, while the component black-and-white image is generated to have the component in white and the background in black in the present embodiment, the component black-and-white image may be generated to have the component in black and the background in white.

Next, it is described in detail about the generation method of the electrode black-and-white image in the step S104.

Figure 9:
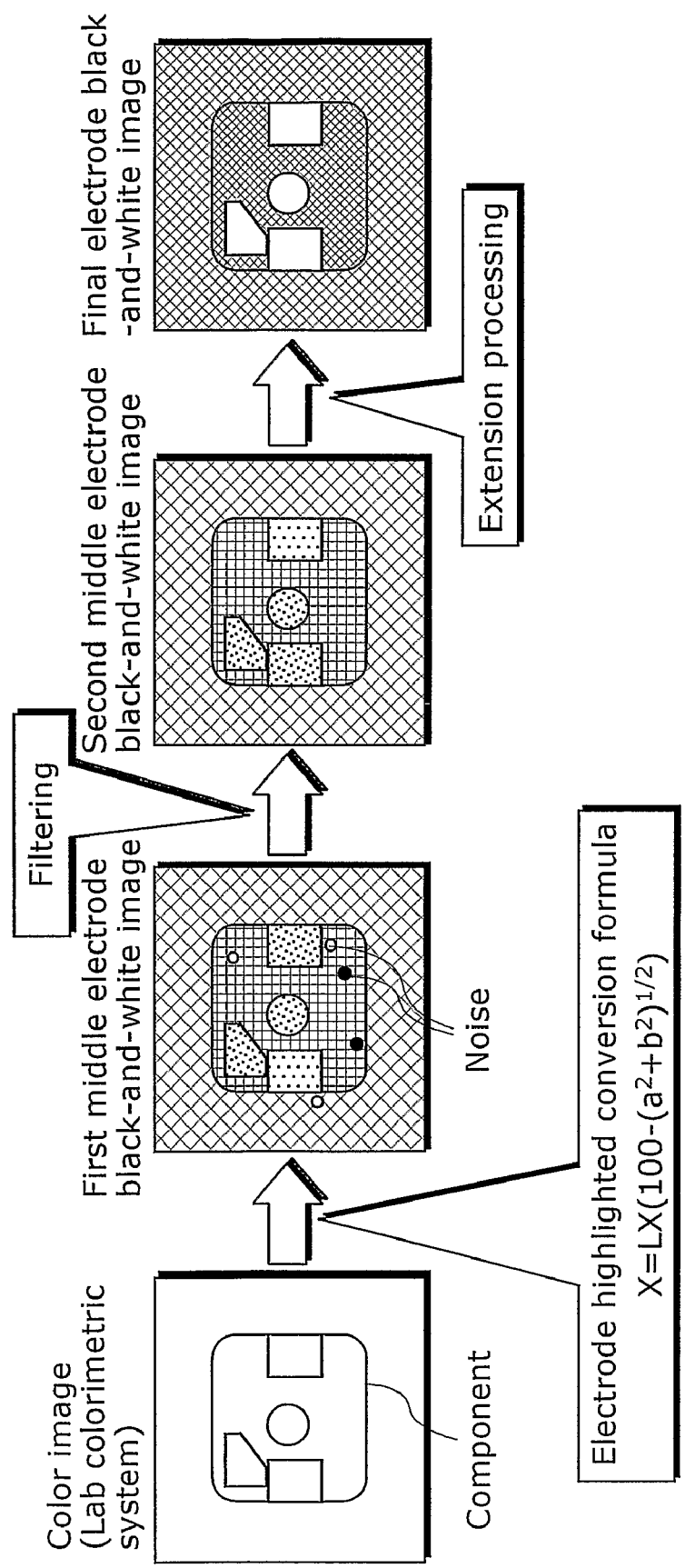
FIG. 9 is a diagram for explaining a generation method of an electrode black-and-white image according to the first embodiment of the present invention.

FIG. 9 is a diagram for explaining the generation method of the electrode black-and-white image according to the present embodiment.

The image processing unit 123 obtains a color image of the component from the scanner 170, and converts the color image into an electrode black-and-white image using an electrode highlighted conversion formula. Through the electrode highlighted conversion formula, the color closer to white can be highlighted by the black-and-white grayscale so that, in the electrode black-and-white image, the electrode of the component is shown in white and other areas and the background are shown in black. The image processing unit 123 then removes noise by filtering the electrode black-and-white image. It then strengthens the contrast between the electrode and other areas of the component further by extending the filtered electrode black-and-white image. Here, the electrode black-and-white image generated at first from the color image is called a first middle electrode black-and-white image, the electrode black-and-white image generated through filtering is called a second middle electrode black-and-white image, and the electrode black-and-white image generated through extension is called a final electrode black-and-white image.

Specifically, when the image processing unit 123 generates the first middle electrode black-and-white image from the color image, it first converts the color image shown in the RGB calorimetric system into a color image shown in Lab calorimetric system.

Figure 10:
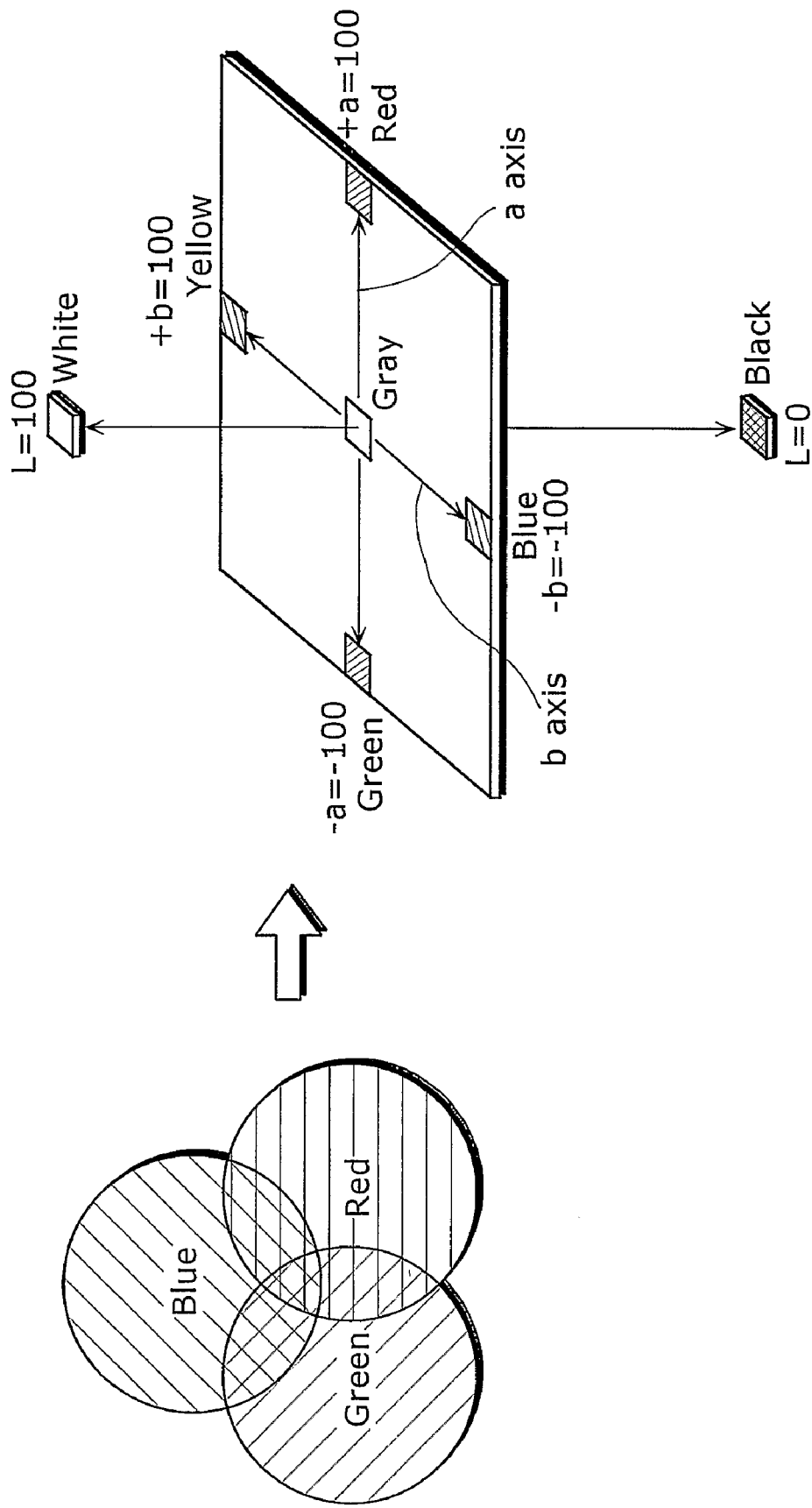
FIG. 10 is a diagram for explaining an RGB calorimetric system and a Lab calorimetric system.

FIG. 10 is a diagram for explaining the RGB colorimetric system and the Lab calorimetric system.

In the case where the color image outputted from the scanner 170 is structured in a Bit Map (BMP) format, the color image is shown in the RGB calorimetric system. In other words, each pixel included in the color image has a RGB value made up of a grayscale value of red R, a grayscale value of green G, and a grayscale value of blue B, and shows a color specified by the RGB value.

Each pixel included in the color image of the Lab calorimetric system has a Lab value made up of an L value which indicates brightness, and a and b values which indicate chromaticity, and shows a color specified by the Lab value. Here, the a-axis indicates a range of colors from red to green and the b-axis indicates a range of colors from yellow to blue. In other words, the image processing unit 123 converts the RGB value indicated by each value of the color image obtained from the scanner 170 into the Lab value.

Next, the image processing unit 123 converts, for each pixel included in the color image of the Lab colorimetric system, the Lab value indicated by the pixel into a black-and-white grayscale value X using the electrode highlighted conversion formula $X=L\times(100-(a^2+b^2)^{1/2})$. As the result, the first middle electrode black-and-white image is generated. It should be noted that the value L takes a value in a range from 0 to 100, the a and b values respectively take a value in a range from −100 to +100, and a constant 100 of the electrode highlighted conversion formula is determined depending on the value ranges that can be taken by a and b values.

Figure 11:
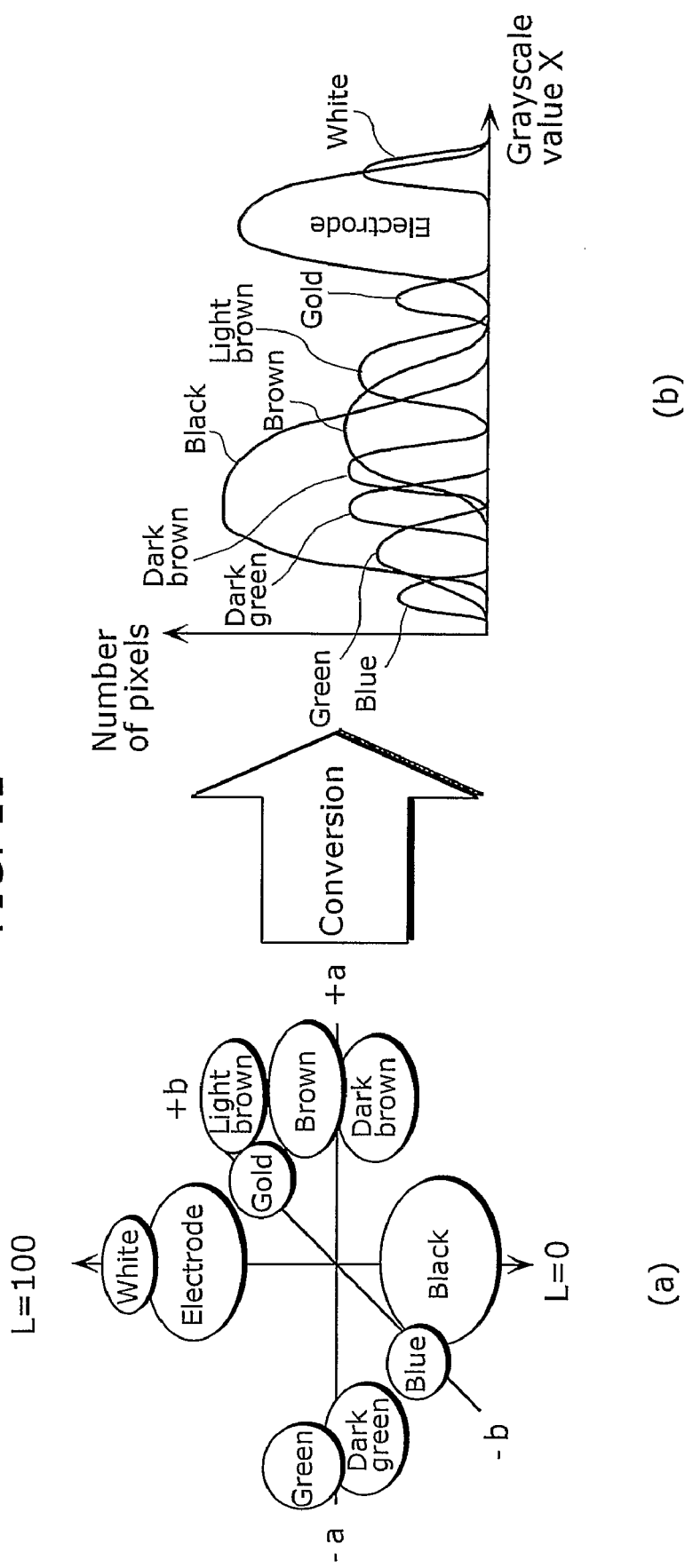
FIG. 11 is a diagram showing a distribution of each color included in a general component (electric component)

FIG. 11 is a diagram showing a distribution of each color included in a general component (electronic component).

Each pixel included in the color image of the Lab calorimetric system showing the general component is distributed as shown in FIG. 11(a).

In other words, pixels corresponding to an electrode of the component are in a bright achromatic color so that the L value is high and the a and b values are distributed in an area close to 0. Also, most areas of the component other than the electrode are dark colors so that most of the pixels corresponding to that area are distributed in an area in which the L value is small.

Here, when the image processing unit 123 converts the Lab value of each pixel included in the color image into a grayscale value X using the electrode highlighted conversion formula, each pixel, shown in a color of the Lab colorimetric system, included in the color image is distributed as shown in FIG. 11(b). In other words, pixels corresponding to the electrode shown in color close to white are distributed in an area where the grayscale value X is high and pixels corresponding to the package and background shown in dark color such as black are mostly distributed in an area where the grayscale value X is small. Accordingly, in the first middle electrode black-and-white image generated by the conversion formula, the electrode is highlighted so as to show the electrode of the component in white and the other areas and background in black. That is, the outline of the electrode of the component can be distinguished.

When the image processing unit 123 generates the second middle electrode black-and-white image from the first middle electrode black-and-white image, it performs filtering on the middle electrode black-and-white image using a median filter. In other words, in the first middle electrode black-and-white image, the image processing unit 123 arranges respective grayscale value X of each of 3×3 pixels including a focused pixel in the center in an ascending order of the grayscale values, and defines a grayscale value X positioned in the center as a grayscale value X of the focused pixel. The image processing unit 123 generates the second middle electrode black-and-white image by performing such processing on each pixel as a focused pixel.

Through such filtering, the influence of noise against the second electrode black-and white image is restrained and the outline of the electrode of the component can be distinguished. Also, for a relatively small electrode, the influence of noise can be largely reduced.

Next, when the image processing unit 123 performs extension processing, it retrieves, out of the grayscale values of pixels included in the second middle electrode black-and-white image, a grayscale value as a basis for characterizing distinction of black and white (hereafter referred to as reference grayscale value) and a maximum value of the grayscale values (hereafter referred to as maximum grayscale value). The image processing unit 123 then extends the range from the reference grayscale value to the maximum grayscale value to a range from 0 to 255. Such extension processing is performed similarly as the extension processing described with references to FIG. 6 and FIG. 7.

Accordingly, in the present embodiment, the outline of the electrode of the component can be more distinguished by widening the gap of grayscales between the outline of the electrode of the component and the other areas and background in order to extend the grayscale range of the second middle electrode black-and-white image. Also, the grayscale values that are smaller than the reference grayscale value a among the grayscale values of pixels in the second middle electrode black-and-white image are all set to 0. Therefore, even there is a limit in the range of grayscale values that is 256 scales of gray, the grayscale range in an effective area of the second middle electrode black-and-white image can be extended in the limited range.

Figure 12:
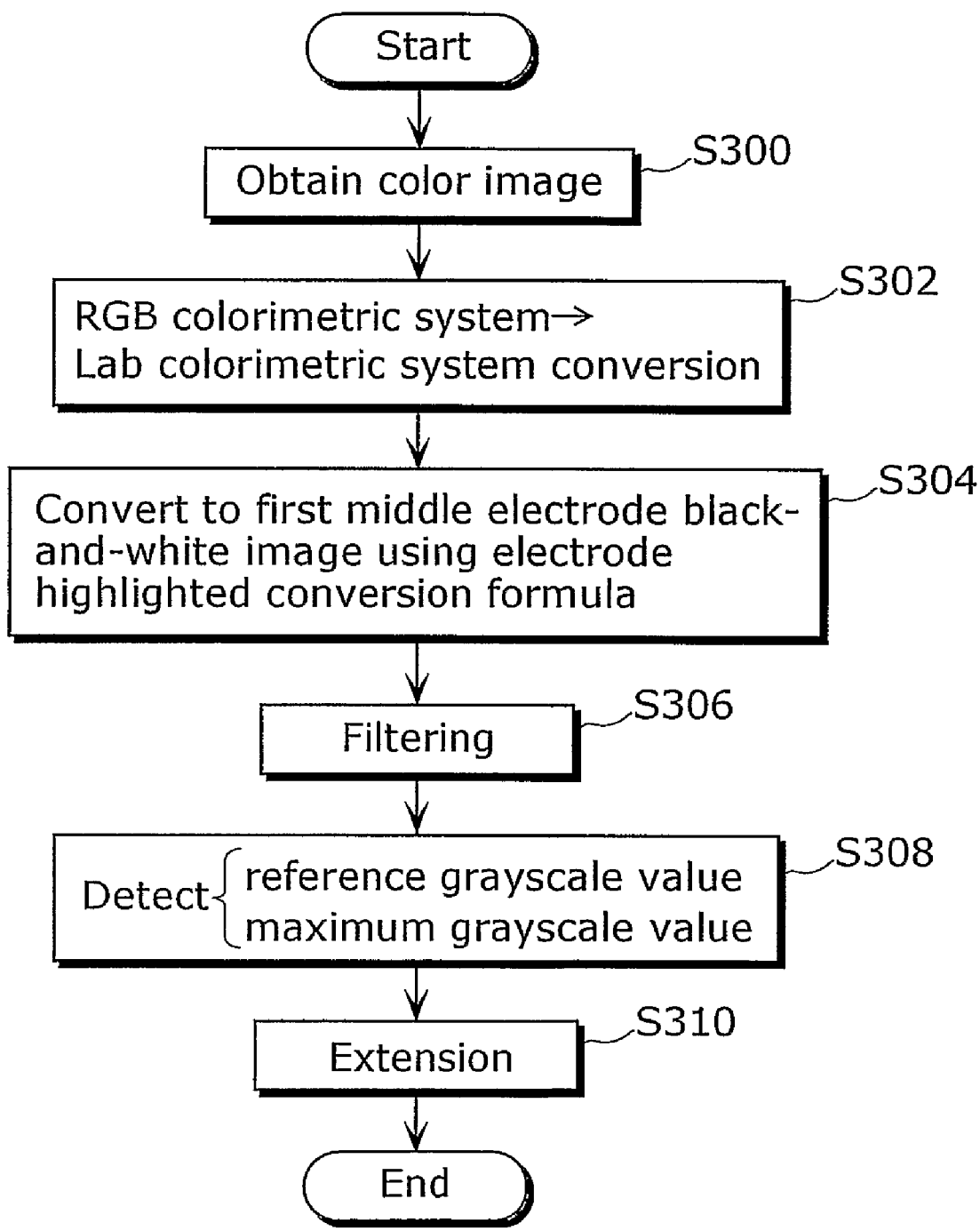
FIG. 12 is a flowchart showing an operation of generating a final electrode black-and-white image of the component by the image processing unit according to the first embodiment of the present invention.

FIG. 12 is a flowchart showing an operation (the operation of step S104 in FIG. 4) of the image processing unit 123 to generate the final electrode black-and-white image of the component.

The image processing unit 123 first obtains a color image from the scanner 170 (step S300), and converts the calorimetric system of the color image from the RGB calorimetric system to the Lab calorimetric system (step S302). Next, the image processing unit 123 converts a Lab value indicated by each pixel included in the color image into a black-and-white grayscale value X using the electrode highlighted conversion formula, and generates the first middle electrode black-and-white image (step S304).

The image processing unit 123 then generates the second middle electrode black-and-white image by filtering the first middle electrode black-and-white image (step S306), and retrieves the reference grayscale value a and the maximum grayscale value b from the second middle electrode black-and-white image (step S308). Following that, the image processing unit 123 performs extension processing on the second middle electrode black-and-white image using the reference grayscale value a and the maximum grayscale value b, and generates the final electrode black-and-white image (step S310).

Accordingly, in the present embodiment, the outline of the electrode of the component can be distinguished in the electrode black-and-white image because the color of the electrode of the component shown in the color image is close to white even it is a bright achromatic color and such color image is converted into the electrode black-and-white image in which whiter colors are more highlighted. Further, in the present embodiment, the scanner 170 can be replaced to a scanner that is commercially manufactured and the control unit 120, the operation unit 110 and the display unit 130 can be replaced to a personal computer and the like. Therefore, the costs for image generation can be reduced. Further, the component automatic teaching apparatus 100 in the present embodiment detects the outline from the final electrode black-and-white image, and measures the dimension of an electrode of the component from the outline. Therefore, compared to the case where the outline is detected directly from the color image, the burden on the processing of measuring a dimension can be reduced.

It should be noted that, while the component black-and-white image is generated to have the electrode of the component in white and the area other than the electrode in black in the present embodiment, the component black-and-white image may be generated to have the electrode of the component in black and the other areas in white.

Further, in the generation of the electrode black-and-white image according to the present embodiment, the color of the background of the color image of the component can be any colors such as blue, red and green except colors closer to white.

Furthermore, in the generation of the electrode black-and-white image according to the present embodiment, while the electrode black-and-white image is generated so that the color closer to white included in the color image becomes whiter, a part that is extremely white included in the electrode black-and-white image further may be turned into black. For example, when the color image of the component 1 whose body is white is converted into the electrode black-and-white image using the electrode highlighted conversion formula, in the electrode black-and-white image, not only the electrode of the component 1 but also its body are shown in white so that it is difficult to detect the outline of the electrode. Accordingly, using the fact that an actual color of the electrode (silver) is a color darker than white, the grayscale value that is larger than a grayscale value of a pixel corresponding to the electrode from the grayscale values of pixels included in the electrode black-and-white image into a minimum grayscale value (X=0). That is to say, a pixel whiter than the pixel corresponding to the electrode is changed to black.

For example, in the electrode black-and-white image, in the case where the grayscale value of a pixel corresponding to a silver electrode is 240 and a grayscale value of a pixel corresponding to a white body is 255, it is difficult to detect the outline of the electrode from the electrode black-and-white image. However, as described in the above, by converting the grayscale values that are more than 250 out of the grayscale values of pixels included in the electrode black-and-white image into 0, in the converted electrode black-and-white image, the grayscale value of the pixel corresponding to the body is 0, while the grayscale value of the pixel corresponding to the electrode is 240. Therefore, only the electrode is highlighted so that the outline of the electrode can be easily detected from the electrode black-and-white image.

Such additional conversion processing is performed in the case where the body of the component 1 is white, and the black-and-white grayscale image (component black-and-white image) generated separately for detecting the outline of the component 1 is used for judging whether or not the body is white. In other words, in the black-and-white grayscale image for the outline of the component, an average grayscale value of an area corresponding to the body of the component 1 is measured, and it is judged that the body is white when the grayscale value is greater than a threshold. It should be noted that while the area corresponding to the body differs depending on a type of the component 1, generally, it is a central area of the component 1.

Further, the pixel whose grayscale value is 250 or more is retrieved from the electrode black-and-white image as a whole, and the grayscale value of the pixel may be converted into 0. Furthermore, the grayscale value of the pixel is retrieved from an area corresponding to the component 1 of the electrode black-and-white image and may be converted into 0.

Second Embodiment

Hereafter, it is described about a component automatic teaching apparatus according to a second embodiment of the present invention.

Figure 13:
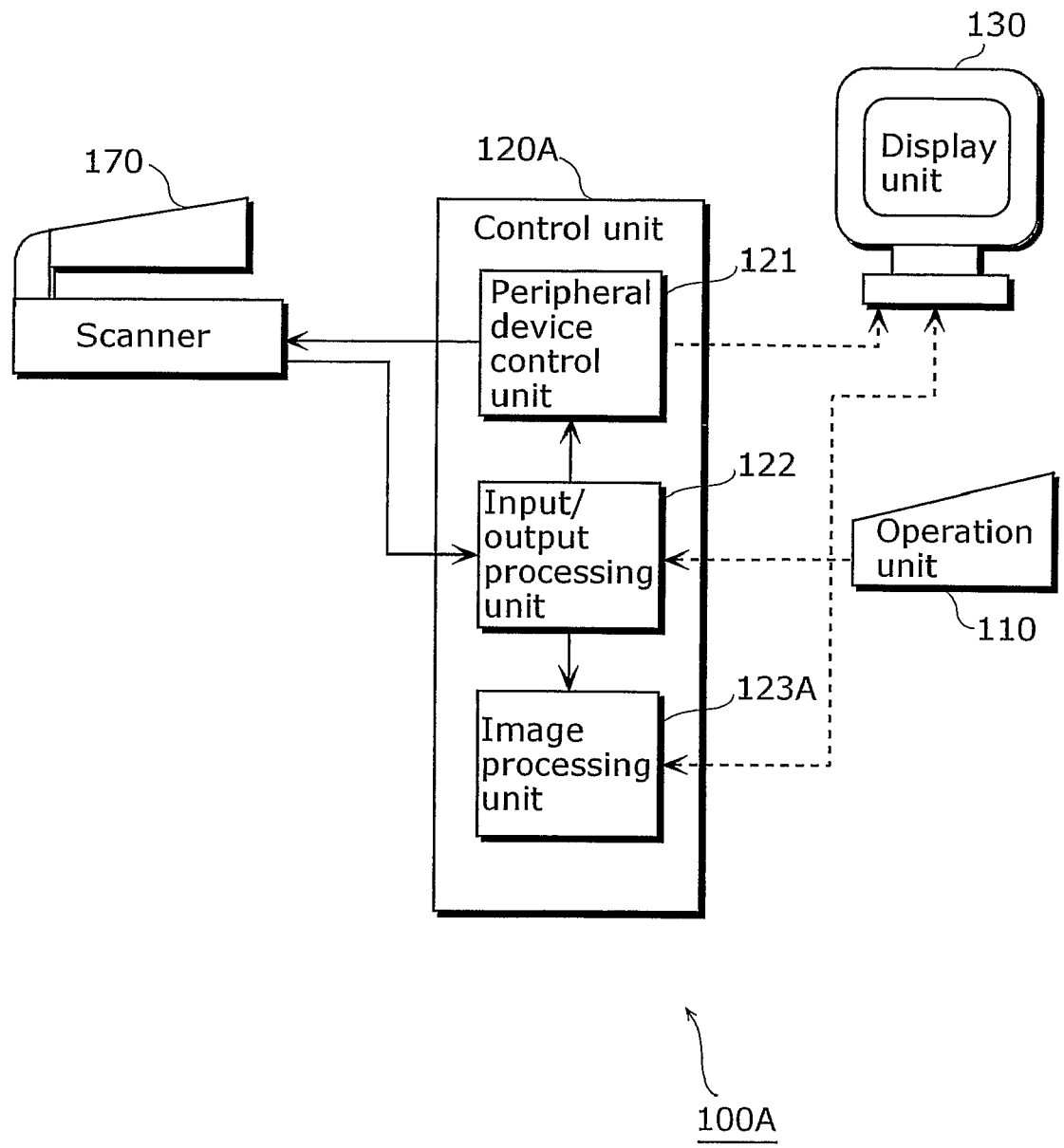
FIG. 13 is a diagram showing a structure of a component automatic teaching apparatus according to a second embodiment of the present invention.

FIG. 13 is a diagram showing a structure of the component automatic teaching apparatus according to the second embodiment of the present invention.

A component automatic teaching apparatus 100A generates component teaching data which indicates a shape and characteristic dimension of the component using a method of generating an image of an electronic component (hereafter simply referred to as component) of the present invention. It includes a scanner 170 which takes an image of the component, an operation unit 110 which receives an operation made by an operator, a display unit 130 made up of, for example, a liquid crystal display, and a control unit 120A which controls the scanner 170 and the display unit 130 based on the operation received by the operation unit 110. Also, the control unit 120A has a peripheral device control unit 121, an input/output processing unit 122 and an image processing unit 123A.

It should be noted that a same reference number attached to the constituent of the component automatic teaching apparatus 100 according to the first embodiment is attached to a constituent of the component automatic teaching apparatus 100A according to the present embodiment that is same as said constituent, and the detailed explanation about the same constituent is omitted in here.

The component automatic teaching apparatus 100A according to the present embodiment generates a component black-and-white image using a generation method that is different from the generation method of the first embodiment, while it basically has a similar function as the component automatic teaching apparatus 100 according to the first embodiment. In other words, the component automatic teaching apparatus 100A according to the present embodiment performs same operations of steps S100, S104, S106 and S108 shown in FIG. 4. However, in step S101 and S102, it generates a component black-and-white image using a generation method that is different from that of the first embodiment. Hereafter, it is explained in detail about a method of generating a component black-and-white image executed by the component automatic teaching apparatus 100A of the present embodiment.

For example, in the case where the component is bluish, if the color image of the component is generated with a blue background, the contrast between the component and the background becomes low in the component black-and-white image generated from the color image since the color of the component and the color of the background are in the same color type.

Accordingly, in the present embodiment, in the step S102 of FIG. 4, a component black-and-white image is generated from a color image of the component with a blue background using a chroma key technology. If the contrast of the component black-and-white image has not satisfied a predetermined standard, a color image of the component with a red background is then generated and a component black-and-white image is generated from the color image.

In other words, the component automatic teaching apparatus 100A generates a color image of the component with a blue background using a blue cover sheet 173 attached by an operator, and generates a component black-and-white image based on the color image. The component automatic teaching apparatus 100A then judges whether or not the contrast between the component and background in the component black-and-white image satisfies a predetermined standard, and makes the display unit 130 display a message which pursue an operator to take an image of the component again by changing a color of the cover sheet 173, when it is judged that the standard is not satisfied. The operator who saw the message attaches a red cover sheet 173 to a cover 172 of the scanner 170. The component automatic teaching apparatus 100A then retakes an image of the component in color with a red background, and generates a component black-and-white image again based on the color image. Then, an outline of the component is detected from such generated black-and-white image. On the other hand, when it is judged that the contrast satisfies the predetermined standard, the component automatic teaching apparatus 100A detects the outline of the component from already generated component black-and-white image without regenerating a component black-and-white image.

Figure 14:
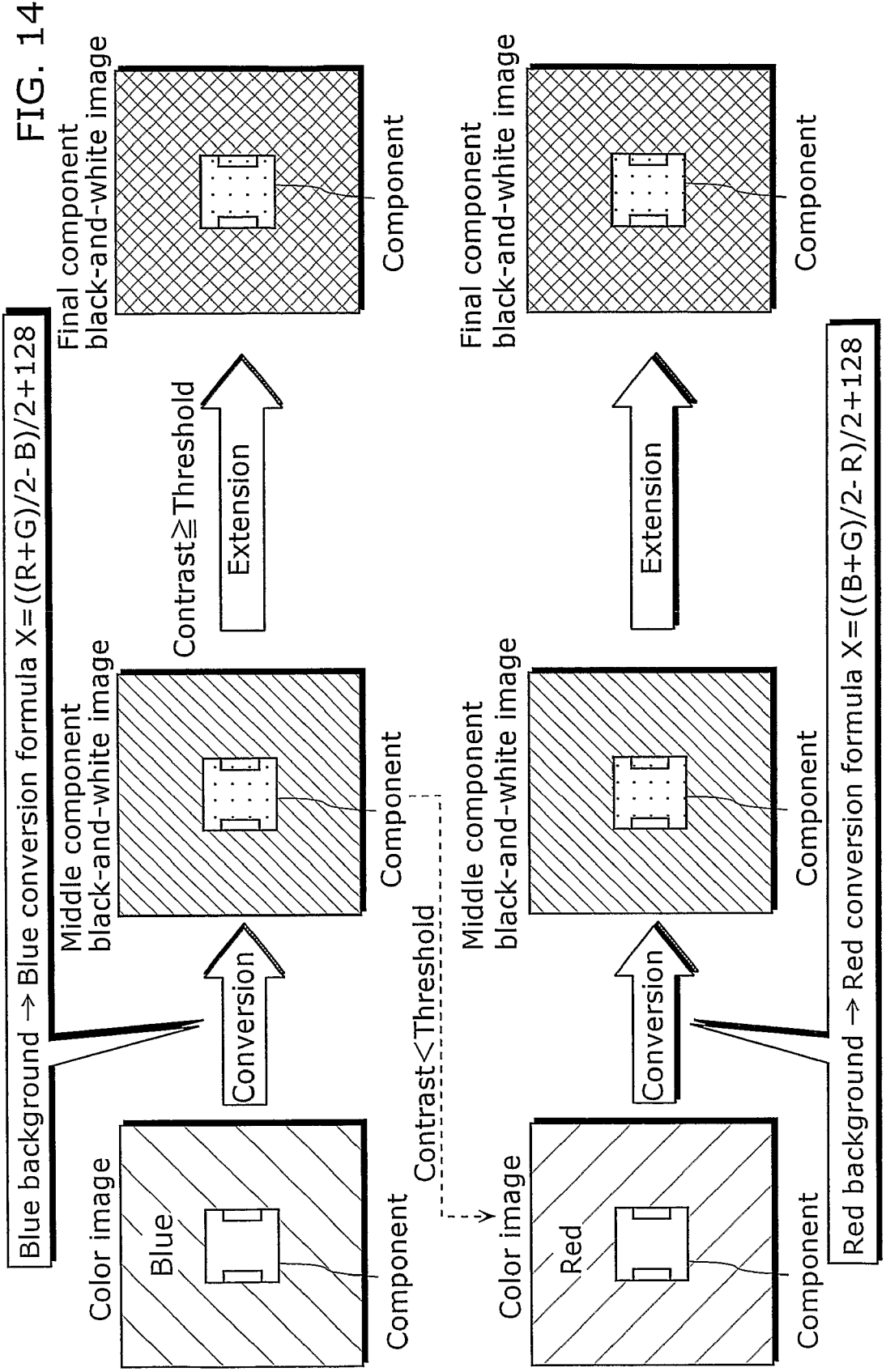
FIG. 14 is a diagram for explaining a generation method of a component black-and-white image according to a second embodiment of the present invention.

FIG. 14 is a diagram for explaining the generation method of the component black-and-white image according to the present embodiment.

The image processing unit 123A obtains a color image of the component from the scanner 170, and specifies whether the color of the background of the color image is blue or red. The image processing unit 123A generates, from the color image, a component black-and-white image in which the component is shown in white and the background is shown in black, using a conversion formula corresponding to a color of the background of the color image. In the case where the contrast between the component and background of the component black-and-white image is equivalent to or higher than a threshold, the contrast is further strengthened by performing extension processing on the component black-and-white image. Here, the component black-and-white image generated at first from the color image is called as a middle component black-and-white image and the component black-and-white image generated after the extension processing is called a final component black-and-white image.

On the other hand, in the case where the contrast between the component and background of the middle component black-and-white image is equal to the threshold or lower, the image processing unit 123A obtains a color image that is retaken so as to have a different background color as described in the above. The image processing unit 123A then specifies whether the color of the background of the color image is blue or red, and regenerates a middle component black-and-white image using a conversion formula corresponding to the color of the background. The image processing unit 123A further generates a final component black-and-white image in which the contrast between the component and the background is strengthened by performing extension processing on the middle component black-and-white image.

Specifically, when a middle component black-and-white image is generated from the color image, the image processing unit 123A converts, for each pixel, for example, a grayscale value of RGB having 256 scales of gray into a black-and-white grayscale value having 256 scales of gray.

When the image processing unit 123A recognizes that the color of the background of the color image is blue, it converts the RGB value indicated by each pixel of the color image into a grayscale value X of black and white having 256 scales of gray using the blue conversion formula $X=((R+G)/2-B)/2+128)$ as described in the first embodiment.

Also, when the image processing unit 123A recognizes that the color of the background of the color image is red, it converts the RGB value indicated by each pixel of the color image into a black-and-white grayscale value X having 256 scales of gray using the red conversion formula $(X=((B+G)/2-R)/2+128)$ as described in the first embodiment.

The contrast in such generated middle component black-and-white image is judged based on projection data.

Figure 15:
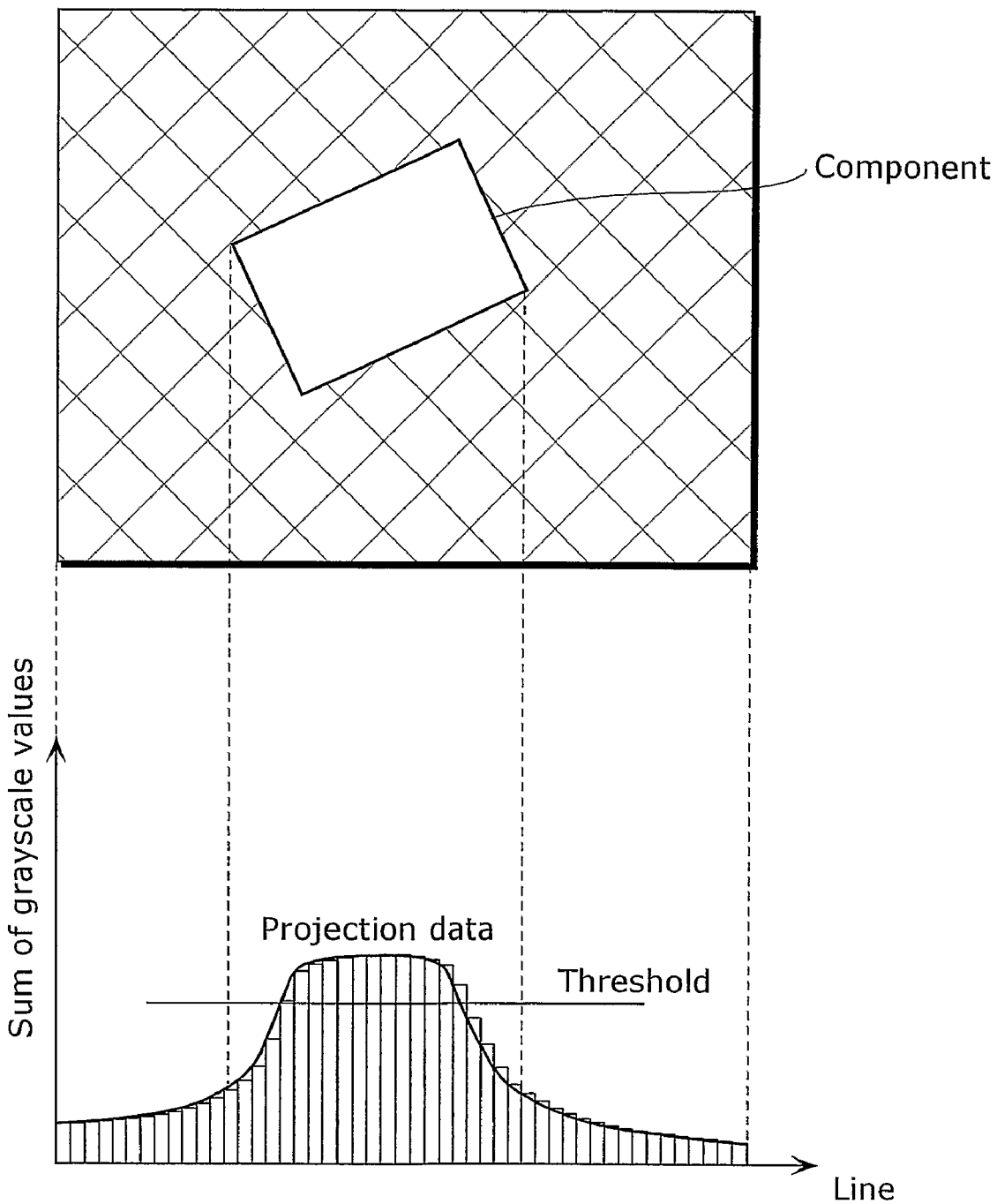
FIG. 15 is a diagram for explaining projection data according to a second embodiment of the present invention.

FIG. 15 is a diagram for explaining the projection data

The image processing unit 123A, in the middle component black-and-white image, adds up grayscale values X of all pixels included in the line for each line of pixels arranged in a line in a vertical direction in FIG. 15, and generates projection data indicating the grayscale value X (sum grayscale value) that is a total sum of each line. In the middle component black-and-white image, the grayscale values X of pixels corresponding to a component are large so that the sum grayscale of a line including many of the pixels is large.

The image processing unit 123A considers that the sum grayscale value as a contrast between the component and the background, and judges that the contrast is equivalent to or more than threshold when the sum grayscale value of one of the lines is equivalent to or more than the threshold. On the other hand, when the sum grayscale value of any of the lines is equivalent to or less than the threshold, it judges that the contrast is equivalent to or less than the threshold.

Accordingly, in the present embodiment, in the case where the contrast of the middle component black-and-white image does not satisfy the predetermined standard, a color image is regenerated so as to have a different color of the background and a middle component black-and-white image is generated from the color image. Therefore, in the middle component black-and-white image, the contrast between the component and the background can be definitely higher regardless of the color of the component.

Next, when the image processing unit 123A generates a final component black-and-white image by performing extension processing, as described in the first embodiment, it retrieves a grayscale value as a basis which characterizes the distinction of black and white (hereafter referred to as reference grayscale value) and a maximum value of the grayscale value (hereafter referred to as maximum grayscale value) out of the grayscale values of pixels included in the middle component black-and-white image. The image processing unit 123A then extends the range from the reference grayscale value to the maximum grayscale value to the range from 0 to 255.

Thus, also in the present embodiment as in the first embodiment, the outline of the component can be more clearly distinguished by widening the gap of grayscales between the outline of the component and the background in order to extend the grayscale range of the middle component black-and-white image. Also, the grayscale values that are less than the reference grayscale value a out of the grayscale values of pixels in the middle component black-and-white image are all set to 0. Therefore, even there is a limit in the range of grayscale values that is 256 scales of gray, the grayscale range in an effective area of the middle component black-and-white image can be extended in the limited range.

Figure 16:
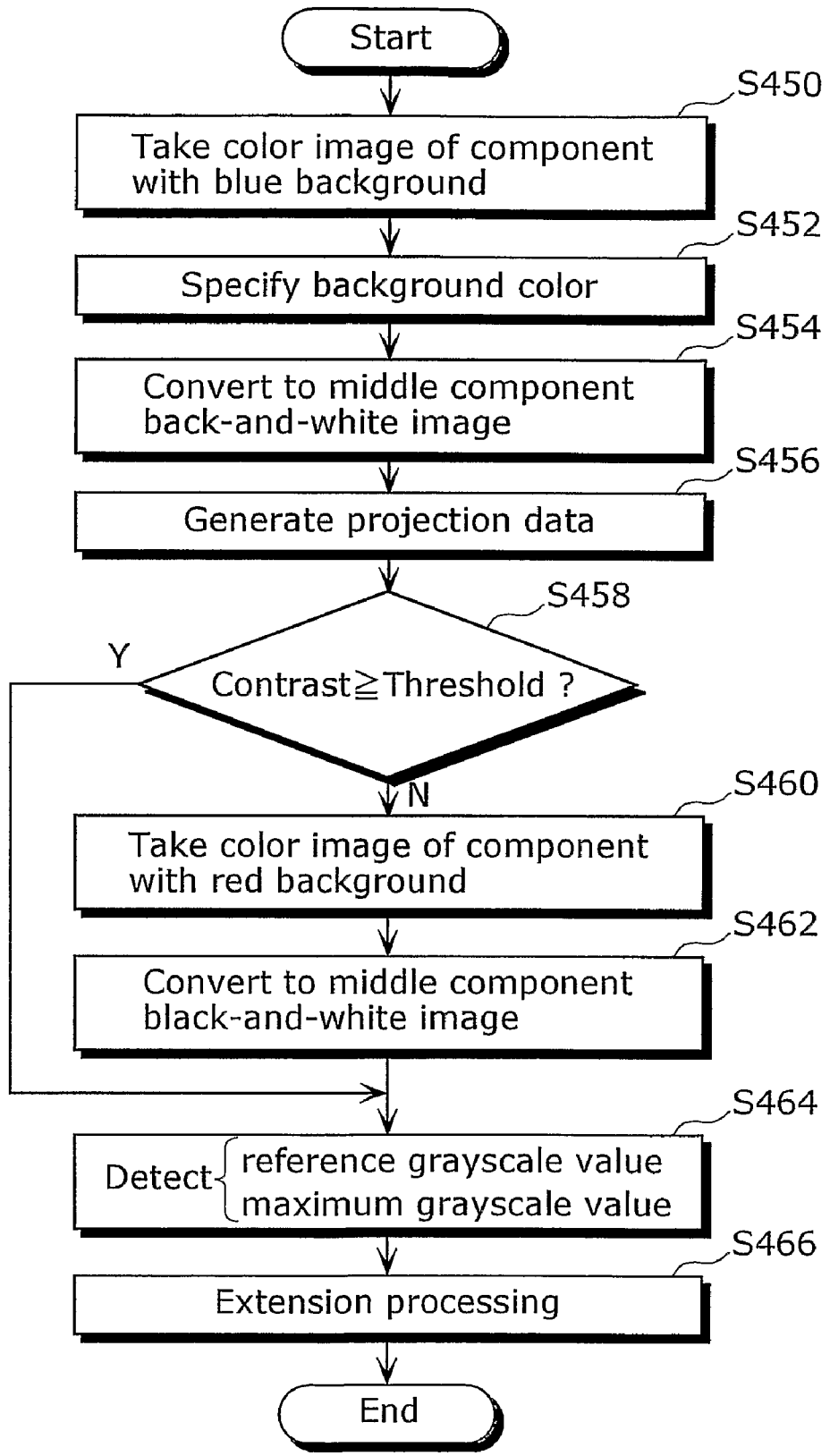
FIG. 16 is a flowchart showing an operation of generating the component black-and-white image by the component automatic teaching apparatus according to a second embodiment of the present invention.

FIG. 16 is a flowchart showing an operation for the component automatic teaching apparatus 100A to generate a component black-and-white image (final component black-and-white image).

First, the operator attaches a blue coversheet 173 to the scanner 170 and the scanner 170 of the component automatic teaching apparatus 100A takes an image of a component in color so as to have a blue background (step S450).

The image processing unit 123A obtains the color image from the scanner 170, and specifies the color of the background of the color image (step S452). Here, the image processing unit 123A specifies that the color of the background is blue because the color image with blue background has been taken in step S450.

The image processing unit 123A then selects the blue conversion formula based on the specification result, and converts the color image into a middle component black-and-white image using the blue conversion formula (step S454). Further, the image processing unit 123A generates projection data for evaluating a contrast from the middle component black-and-white image (step S456).

Here, the image processing unit 123A judges whether or not the sum grayscale value indicated by the projection data, that is, whether or not the contrast of the middle component black-and-white image is equivalent to or more than the threshold (step S458).

In the case where it is judged that the contrast is equivalent to or more than the threshold (Y in step S458), the image processing unit 123A retrieves the reference grayscale value a and the maximum grayscale value b from the middle component black-and-white image (step S464), and performs extension processing on the middle component black-and-white image using the reference grayscale value a and the maximum grayscale b (step S466). As the result, a final component black-and-white image with high contrast is generated.

Also, in the case where it is judged that the contrast is smaller than the threshold (N in step S458), the image processing unit 123A makes the display unit 130 display a message for pursuing to retake a color image. As the result, the blue cover sheet 173 attached to the scanner 170 is replaced to a red cover sheet 173 by an operator. The scanner 170 then takes an image of the component as a color image with red background, and regenerates the color image of the component (step S460). When the color image is generated by the scanner 170 as described in the above, the image processing unit 123A converts the color image into a middle component black-and-white image using the red conversion formula (step S462).

As similar to the above, the image processing unit 123A then retrieves the reference grayscale value a and the maximum grayscale value b from the middle component black-and-white image regenerated in step S462 (step S464), and performs extension processing on the middle component black-and-white image using the reference grayscale value a and the maximum grayscale value b (step S466). As the result, a final component black-and-white image of the component with high contrast is generated.

Accordingly, in the present embodiment, the color image of the component having blue or red background is converted into a black-and-white grayscale image so that the outline of the component in the black-and-white grayscale image can be distinguished, using the blue or red conversion formula that are focused on the color of the background, by widening the gap of grayscales between the outline of the component and the background. Also, even in the case where the contrast is insufficient in the generated black-and-white grayscale image, a black-and-white grayscale image is generated again by changing the color of the background. Therefore, the outline of the component can be definitely distinguished in the black-and-white grayscale image. Further, in the present embodiment, the scanner 170 can be replaced to a scanner that is commercially manufactured and the control unit 120, the operation unit 110 and the display unit 130 can be replaced to a personal computer. Therefore, the costs for image generation can be reduced. Further, the component automatic teaching apparatus 100A in the present embodiment detects the outline from the final component black-and-white image, and measures the dimension of the component from the outline. Therefore, compared to the case where the outline is detected directly from the color image, the burden on the processing of measuring a dimension can be reduced.

Third Embodiment

Hereafter, it is described about a compound automatic teaching apparatus according to the third embodiment of the present invention with references to drawings.

Figure 17:
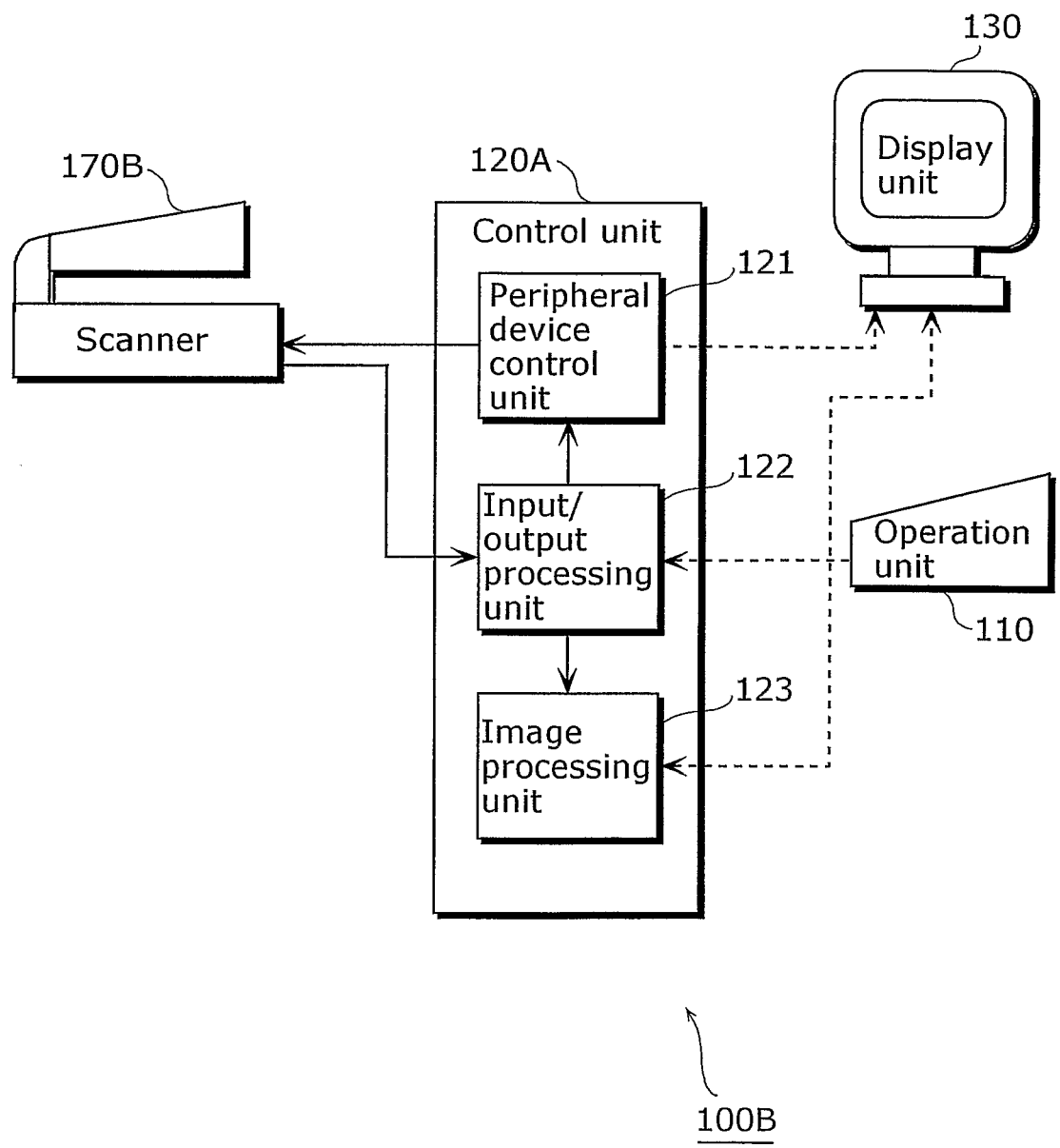
FIG. 17 is a diagram showing a structure of a component automatic teaching apparatus according to a third embodiment of the present invention.

FIG. 17 is a diagram showing a structure of the compound automatic teaching apparatus according to the third embodiment of the present invention.

The compound automatic teaching apparatus 100B generates compound teaching data indicating a shape and characteristic dimension of the component using the method of generating an image of a component according to the present invention. It includes a scanner 170B which takes an image of a component, an operation unit 110 which receives an operation made by an operator, a display unit 130 made up of, for example, a liquid crystal display and the like, and a control unit 120A which controls the scanner 170B and the display unit 130 based on the operation received by the operation unit 110. Further, the control unit 120A has a peripheral device control unit 121, an input/output processing unit 122 and an image processing unit 123A.

It should be noted that a same reference number attached to the constituent of the component automatic teaching apparatus 100A according to the second embodiment is attached to a constituent of the component automatic teaching apparatus 100B according to the present embodiment that is same as said constituent, and the detailed explanation about the same constituent is omitted in here.

By the way, in the first and second embodiments, there is a problem of generating component teaching data indicating inaccurate dimension and shape of a thick (tall height) component.

In other words, when an image of a thick component is taken by the scanner 170, if the component is placed on the scanner 170, a big clearance as thick as the thick component is generated between the cover 172 and cover 173 and a glass plate 171b. If the scanner 170 takes an image of the component in such state, a color image with dark background or an inconsistent color image is generated. As the result, the body of the component and the outline of the electrode are not extracted so that a big gap is generated for their dimension measurements.

Figure 18:
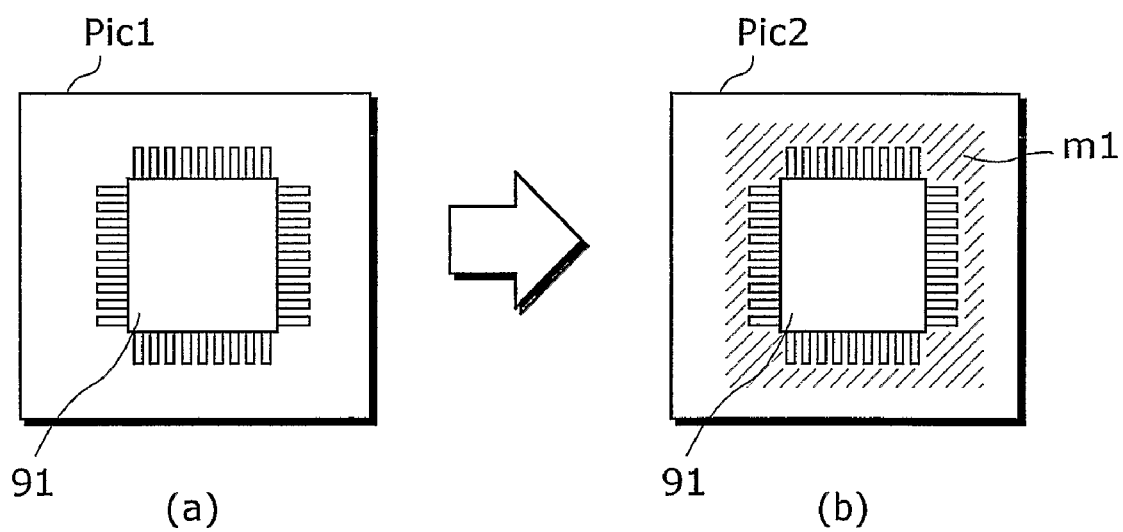
FIG. 18 is a diagram for explaining a problem caused by a thickness of the component.

FIG. 18 is a diagram for explaining a problem caused because of a thickness of the component.

In the case where the component 91 is thin, as shown in FIG. 18(a), the color of the background shown in a color image Pic1 is consistent and vivid blue or red. On the other hand, in the case where the component 91 is thick as shown in FIG. 18(b), inconsistency m1 is generated in the background of the component 91 shown in the color image Pic2 so that the color of the background becomes dark.

Further, a component with a special shape cannot be fixed in an appropriate state. Therefore, as explained in the above, the component teaching data showing an incorrect dimension and shape may be generated.

FIG. 19 is a diagram for explaining a state where the component cannot be fixed in a correct state.

For example, as shown in FIG. 19(a), in the case where an image of a rear side of the component 92 without any distortions is tried to be taken, the component 92 has to be placed correctly on the glass plate 171b of the scanner 170 in a direction where the rear side faces the glass plate 171b. However, in the case where there is a long leg 92a on each side of the component 92, the component 92 does not stay in a fixed position in a state shown in FIG. 19(a) so that it is inclined in a way that the rear side of the component 92 is turned away from the glass plate 171b. Accordingly, the scanner 170 takes an image of the component 92 in a distorted shape. As the result, the body of the component 92 and the outline of the electrode are not extracted correctly from the color image so that compound teaching data showing incorrect dimension can be generated.

Accordingly, the compound automatic teaching apparatus 100B according to the present embodiment can generate compound teaching data precisely indicating a shape of the compound regardless of the shape and size of the compound by having a scanner 170B.

Hereafter, it is explained in detail about the scanner 170B according to the present embodiment.

The scanner 170B according to the present embodiment generates a color image of a component by making the color of the background in consistent blue or red regardless of the shape and size of the component and preventing the inclination of the component.

Figure 20:
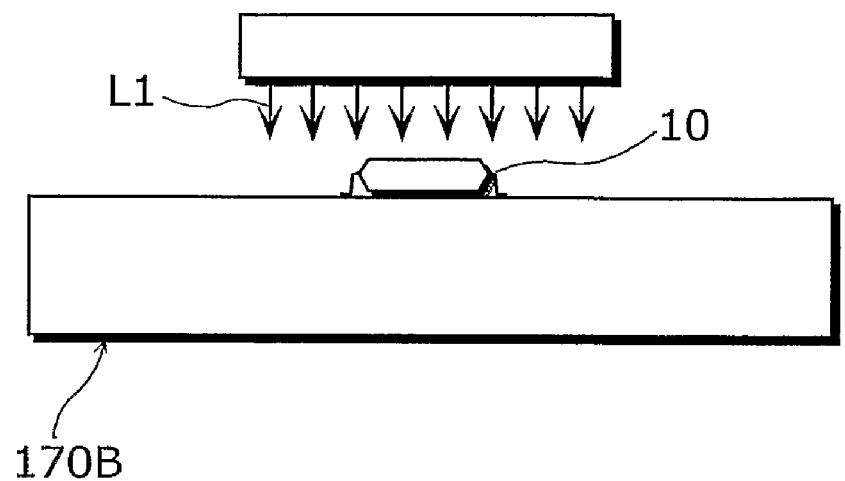
FIG. 20 is a diagram for explaining a characteristic of a scanner according to the third embodiment of the present invention.

FIG. 20 is a diagram for explaining a characteristic of the scanner 170B according to the present embodiment.

As shown in FIG. 20, the scanner 170B irradiates light from a side on which a component 10 is placed and takes an image of the rear side of the component 10. Herein, it irradiates blue or red light L1 evenly from above the component 10.

Consequently, a color image of the component 10 can be generated by making the color of the background vivid and consistent blue or red regardless of the thickness of the component 10.

Figure 21:
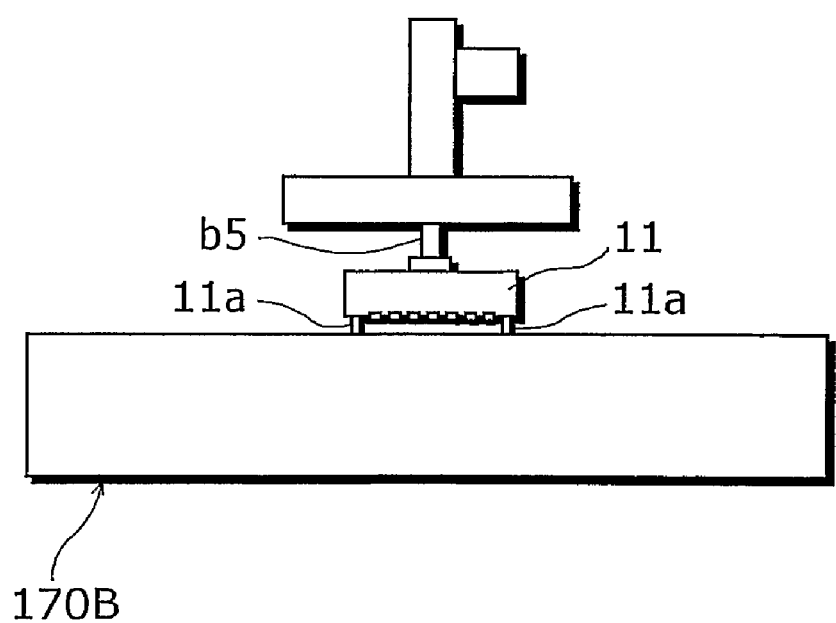
FIG. 21 is a diagram for explaining other characteristics of the scanner according to the third embodiment of the present invention.

FIG. 21 is a diagram for explaining another characteristic of the scanner 170B according to the present embodiment.

As shown in FIG. 21, the scanner 170B irradiates light from the side on which a component 11 is placed and takes an image of the rear side of the component 11. Herein, in the scanner 170B, a nozzle b5 sucks the component 11 so as to hold the component 11 in order to prevent the inclination of the component 11.

Consequently, it can be prevented that the component 11 placed on the scanner 170B to be inclined, for example, because of legs 11a of the component 11. Therefore, an image of a plane (the rear side) of the component 11 to be taken can be taken from the front.

Hereafter, it is described about a specific structure of the scanner 170B as described in the above.

Figure 22:
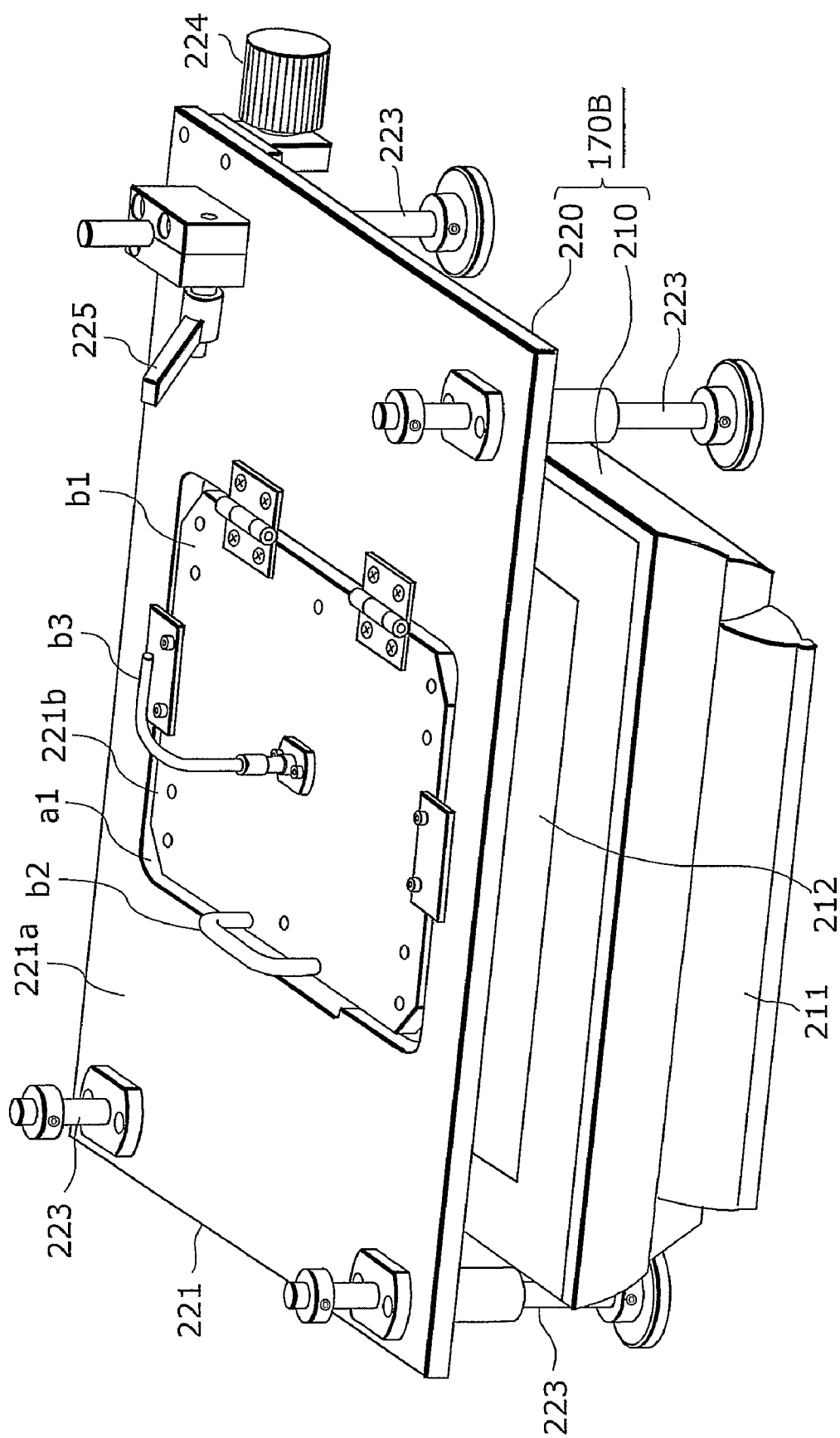
FIG. 22 is a perspective view of the scanner according to the third embodiment of the present invention.

FIG. 22 is a perspective view of the scanner 170B according to the present embodiment.

The scanner 170B includes a scanner body 210 that is an imaging unit and a cover 220 which covers the scanner body 210.

The scanner body 210 has a cabinet 211 nearly in a rectangular box shape, an imaging device and lightening device (not shown in the diagram) embedded in the cabinet 211, and a glass plate 212 attached to the top surface of the cabinet 211. When an image of a component is taken, the component is placed on a side which is a top plane of the glass plate 212 as a reading plane. The lightning device illuminates the component through the glass plate 212, and the imaging device takes an image of the illuminated component through the glass plate 212.

The cover 220 has a cover body 221 nearly in a rectangular box shape as a whole, four columns 223 which support the cover body 221, an up/down handle 224 that is a clearance adjustment unit which moves the cover body 221 up and down along the four columns 223 by a rotation operation by an operator, and a stopper lever 225 for fixing the cover body 221 to the four columns 223.

The cover 220 is placed in a position where the cover body 221 faces the glass plate 212 of the scanner body 210 having a clearance between the cover body 221 and the glass plate 212.

The cover body 221 has a frame plate 221a having an opening a1 nearly in a rectangular shape formed in the center and an open/close unit hanged on hinges around the opening a1 for its operable use so that the opening a1 of the frame plate 221a can be freely closed and opened.

Such open/close unit 221b has an open/close plate b1 nearly in a rectangular shape, a knob b2 in a U-shape for opening and closing the open/close plate b1, a passageway b3 of air formed on the open/close plate b1, a lightning unit (lightning unit) and nozzle (holding unit) placed at the side of the glass plate 212 of the scanner body 210 on the open/close plate b1.

Figure 23:
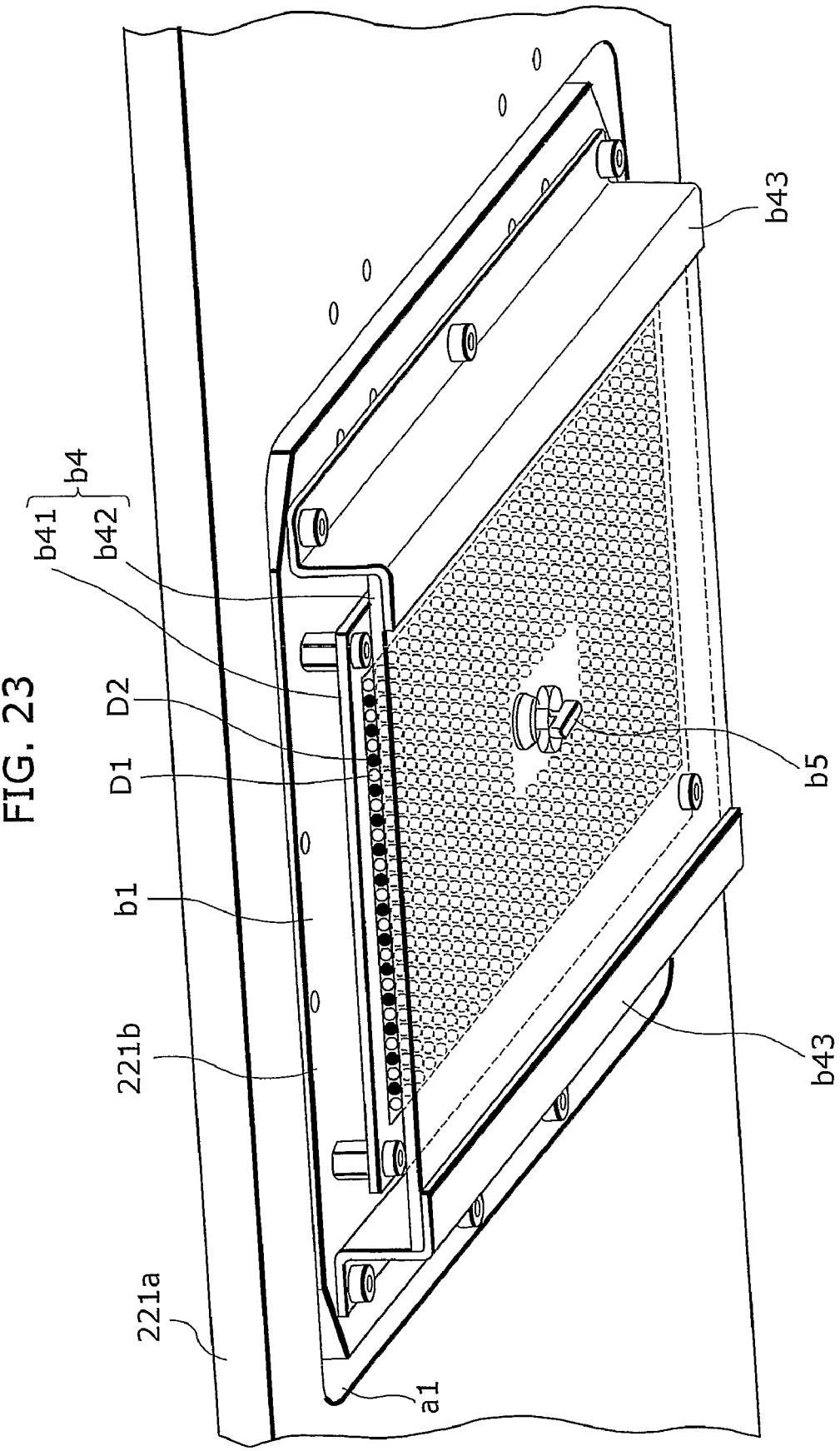
FIG. 23 is a diagram showing a lightening unit and a nozzle of an open/close unit according to the third embodiment of the present invention.

FIG. 23 is a diagram showing the lightning unit and the nozzle of the open/close unit 221b.

The lightning unit b4 of the open/close unit 221b has a light-emitting plate b41 that is made of light-emitting diodes D1 which emit blue light and light-emitting diode D2 which emit red light that are arranged evenly on the substrate, and a diffusion plate b42 which diffuse light as light glass does.

The light-emitting plate b41 is fixed by screws to the open/close plate b1 so as to emit light toward the glass plate 212 of the scanner body 210.

The diffusion plate b42 is fixed to the open/close plate b1 so as to cover the light-emitting plate b41. In order to screw the diffusion plate b42 to the open/close plate b1, a pair of supports b43 which supports the diffusion plate b42 by being screwed to the open/close plate b1 is used.

Figure 24:
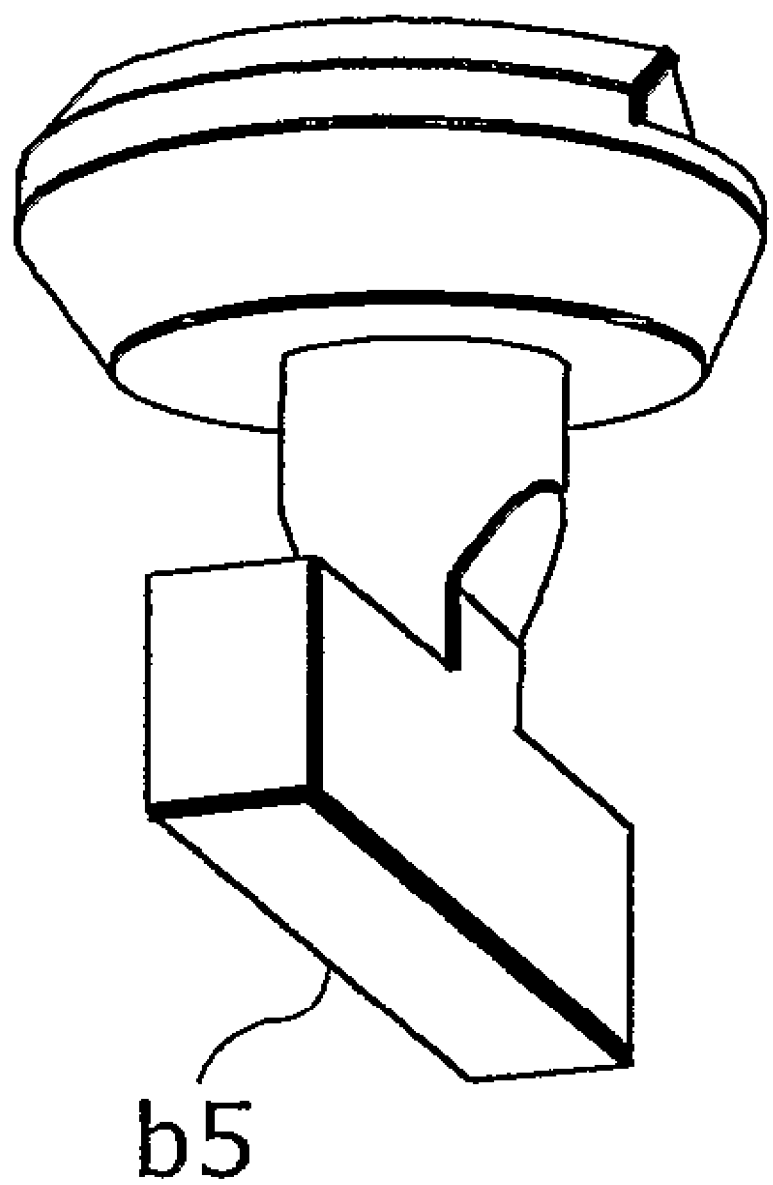
FIG. 24 is a perspective view of the nozzle according to the third embodiment of the present invention.

FIG. 24 is a perspective view of the nozzle.

The nozzle b5 is attached to the open/close plate b1 so as to pass through nearly the center of the light-emitting plate b41 and the diffusion plate b42. A tip of the nozzle b5 is formed nearly in a T-shape, and its inside is communicating to the passageway b3.

When a suction tube such as an air suction device is inserted in the passageway b3, the nozzle b5 sucks air from the tip of the nozzle b5 by driving the air suction device. Accordingly, when the air suction device starts driving, the inside of the nozzle is pressed to the negative pressure so that the nozzle b5 sucks the component. The component is fixed because of the suction by the nozzle b5.

Figure 25:
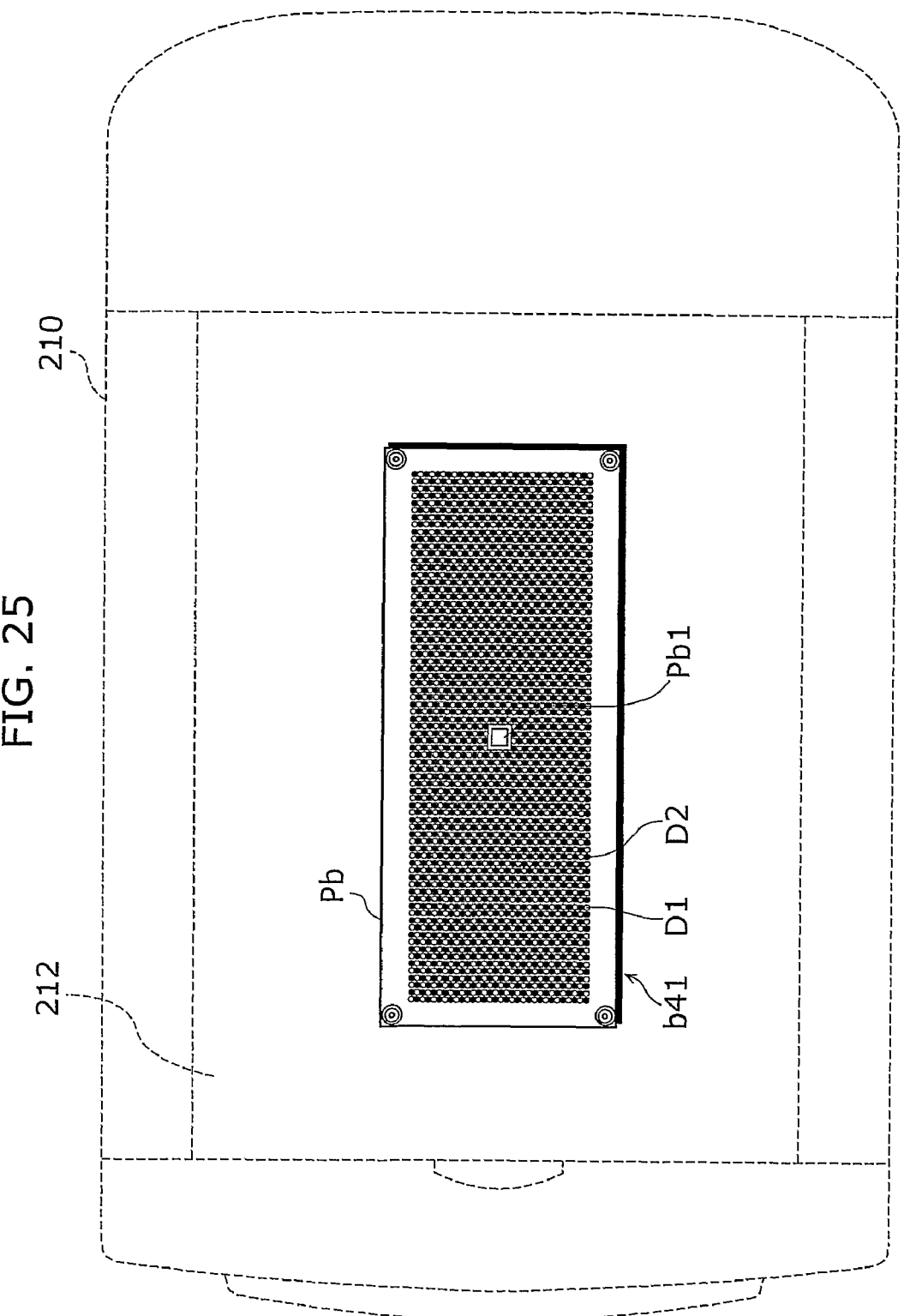
FIG. 25 is a front view of a light-emitting plate according to the third embodiment of the present invention.

FIG. 25 is a front view of a light-emitting plate b41.

A substrate Pb of the light-emitting plate b41 is formed nearly in an elongated rectangular of, for example, a width of 86 mm and a length of 218 mm. Also, an insertion hole Pb1 for inserting the nozzle b5 is formed nearly at the center of the substrate Pb. The multiple light-emitting diodes D1 and D2 are mounted in a rectangular of, for example, a width of 78 mm and a length of 210 mm on the substrate Pb. In addition, such light-emitting plate b41 is fixed to an open/close plate b1 so as to be positioned nearly the center of the glass plate 212 of the scanner body 210. Further, the multiple light-emitting diodes D1 and D2 are mounted in the rectangular range consistently and evenly.

Figure 26:
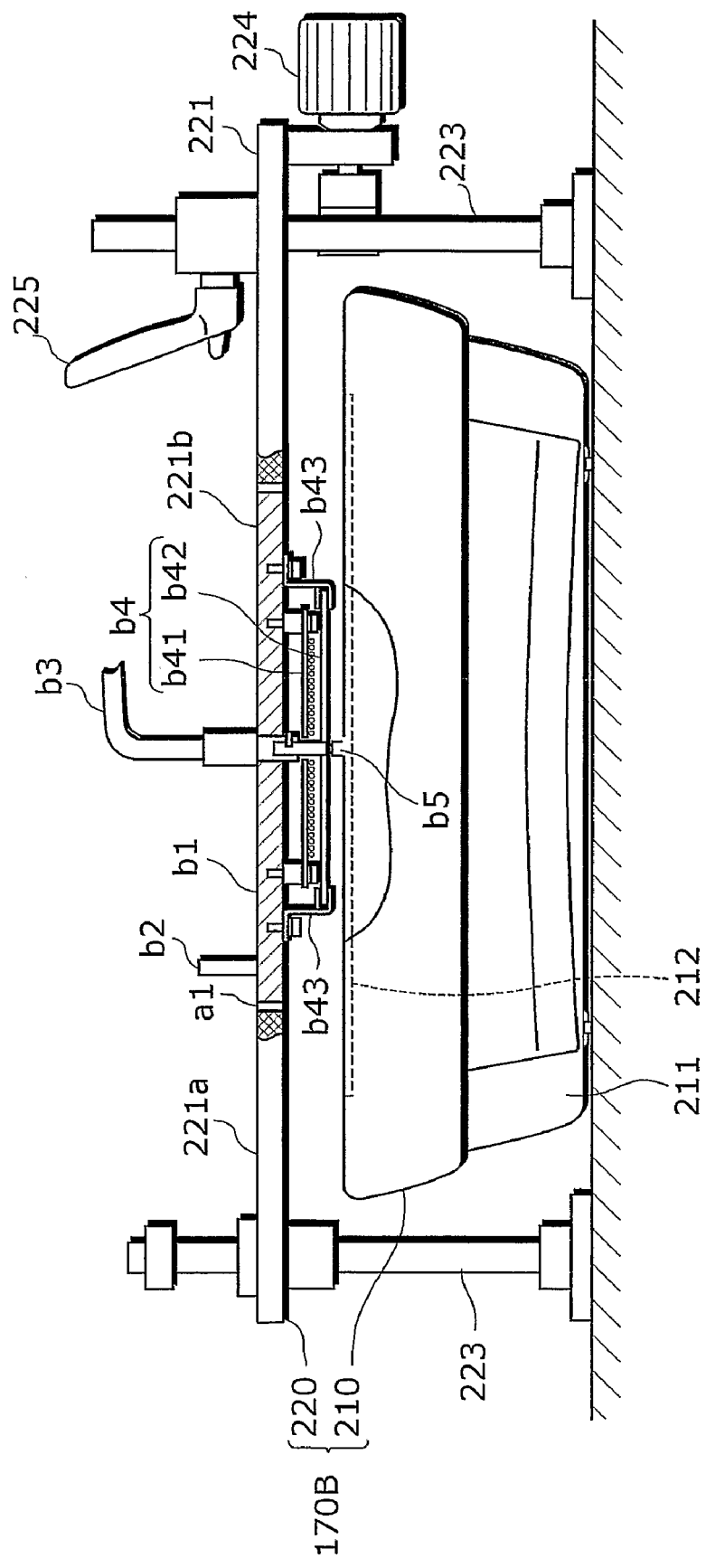
FIG. 26 is a cross section diagram of a front part of the scanner according to the third embodiment of the present invention.

FIG. 26 is a cross section diagram of a front part of the scanner 170B.

As shown in FIG. 24, when the open/close unit 221b of the cover 220 is closed, the open/close plate b1, light-emitting plate b41 and diffusion plate b42 of the open/close unit 221b are parallel to the glass plate 212 of the scanner body 210.

When making the scanner 170B generate a color image of a component, an operator first adjusts a height of the cover body 221 of the cover 220 using the up/down handle 224, considering the thickness of the component. Herein, the operator adjusts the height so as to separate the tip of the nozzle b5 from the glass plate 212 of the scanner body 210 at least as long as the thickness of the component in a state where the open/close unit 221b is closed. The operator then rotates the stopper lever 225 and fixes the cover body 221 to the four legs 223.

Next, the operator holds the handle b2 of the open/close unit 221b and opens the open/close unit 221b.

Figure 27:
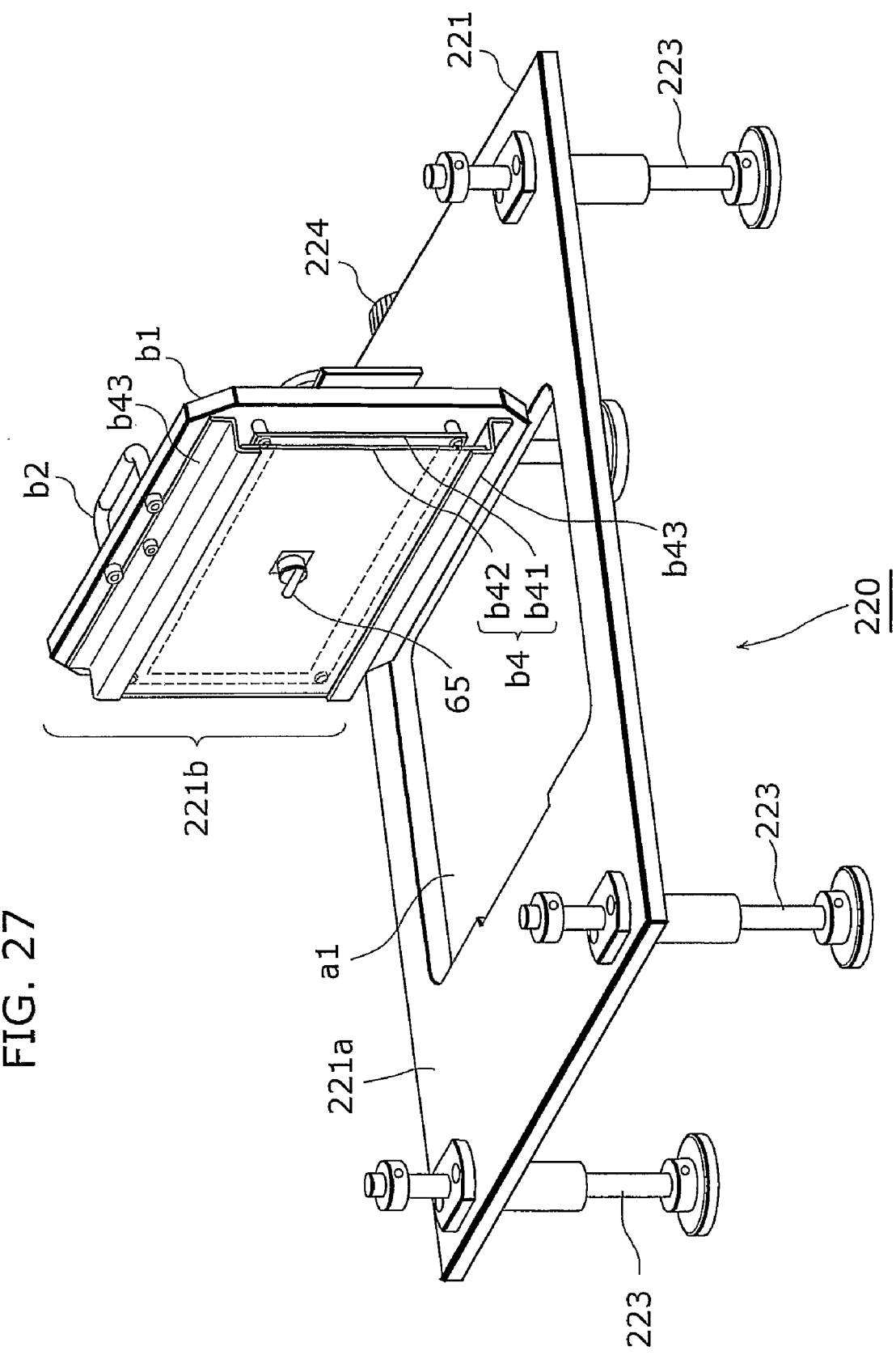
FIG. 27 is a perspective view showing a state where an open/close unit of a cover is opened according to the third embodiment of the present invention.

FIG. 27 is a perspective view showing a state where the open/close unit 221b of the cover 220 is opened.

When the operator opens the open/close unit 221b, the glass plate 212 of the scanner body 210 can be looked through the opening a1 of the frame plate 221a.

In such a state, the operator starts sucking the air from the tip of the nozzle b5 by driving an air suction device. The operator then sucks the component to the tip of the nozzle b5.

Figure 28:
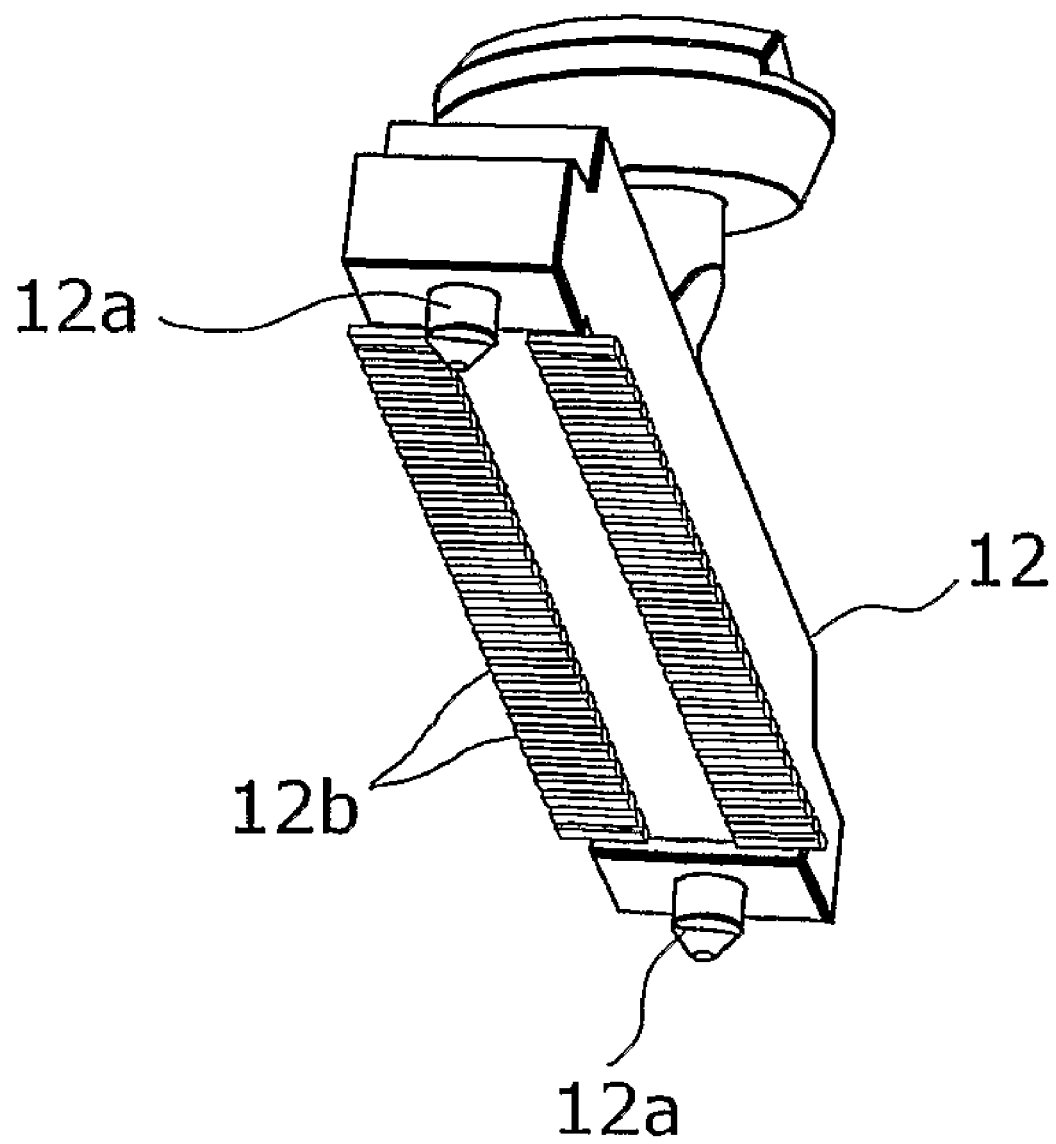
FIG. 28 is a diagram showing a state where a component is sucked to a tip of the nozzle according to the third embodiment of the present invention.

FIG. 28 is a diagram showing a state where the component is sucked to the tip of the nozzle b5.

For example, as shown in FIG. 28, the component 12 whose image is to be taken is formed elongated as a whole, long legs 12a are placed so as to stick out from both sides of a plane on which the electrode 12b is placed (hereafter referred to as electrode plane).

In the case where an image of the electrode plane of the component 12 is taken and its color image is generated, as shown in FIG. 28, the operator attaches the tip of the nozzle b5 to a plane opposite to the electrode plane of the component 12. As the result, since air is sucked from the tip of the nozzle b5, the component attached to the tip is sucked to the tip of the nozzle b5. In other words, the nozzle b5 holds the component 12 in a state where its electrode plane is faced to the other side of the light-emitting plate b41.

Next, the operator closes the open/close unit 221b in a state where the component 12 is sucked to the tip of the nozzle b5.

Figure 29:
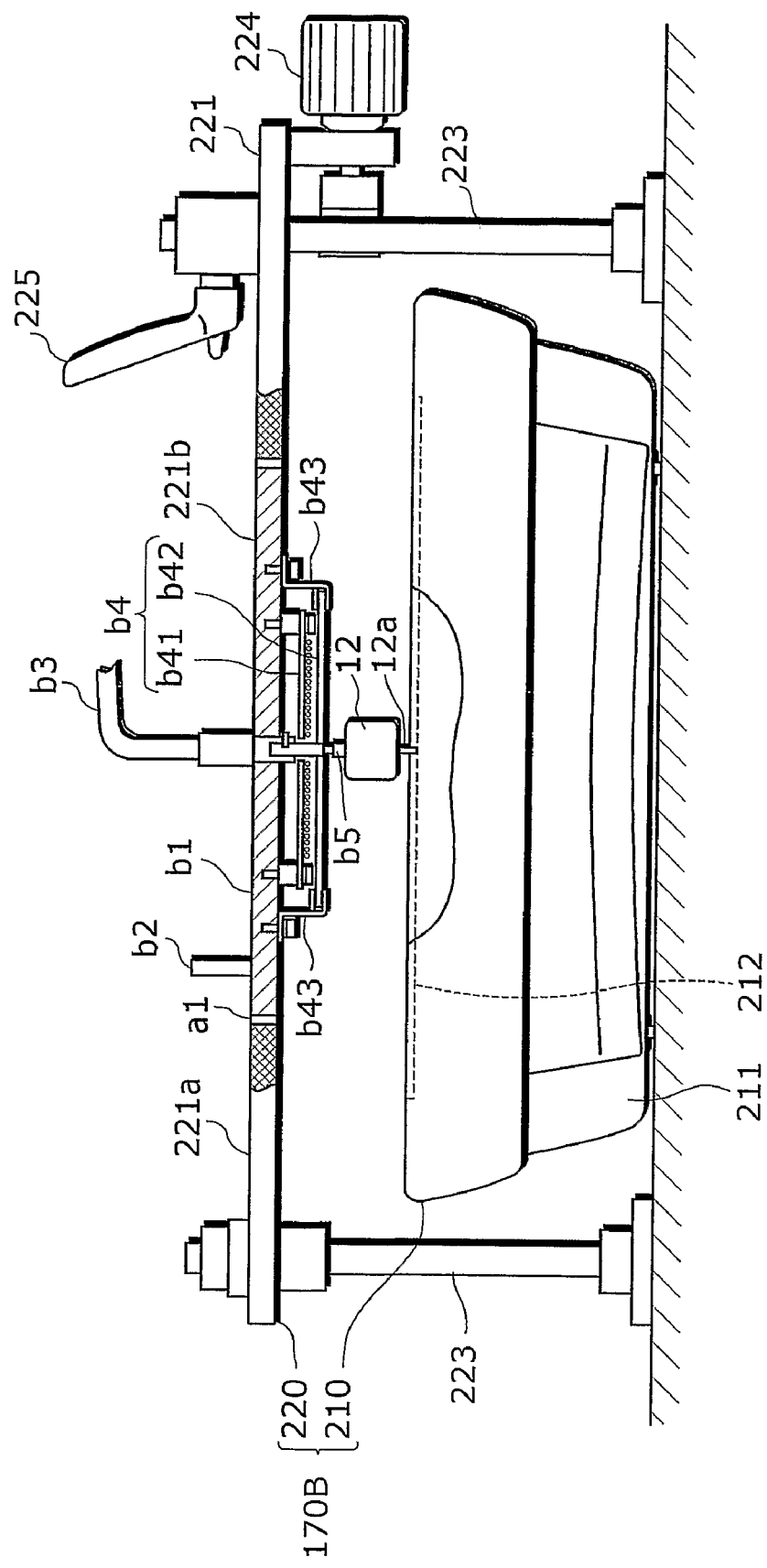
FIG. 29 is a cross-section diagram of a front part of the scanner on which the component is placed according to the third embodiment of the present invention.

FIG. 29 is a cross section diagram of a front part of the scanner 170B on which the component is placed.

As shown in FIG. 29, the component 12 is sucked by the nozzle b5 so that it is held to the glass plate 212 to which the legs 12a of the component 12 are set up vertically and the electrode plane of the component 12 is faced in parallel.

Figure 30:
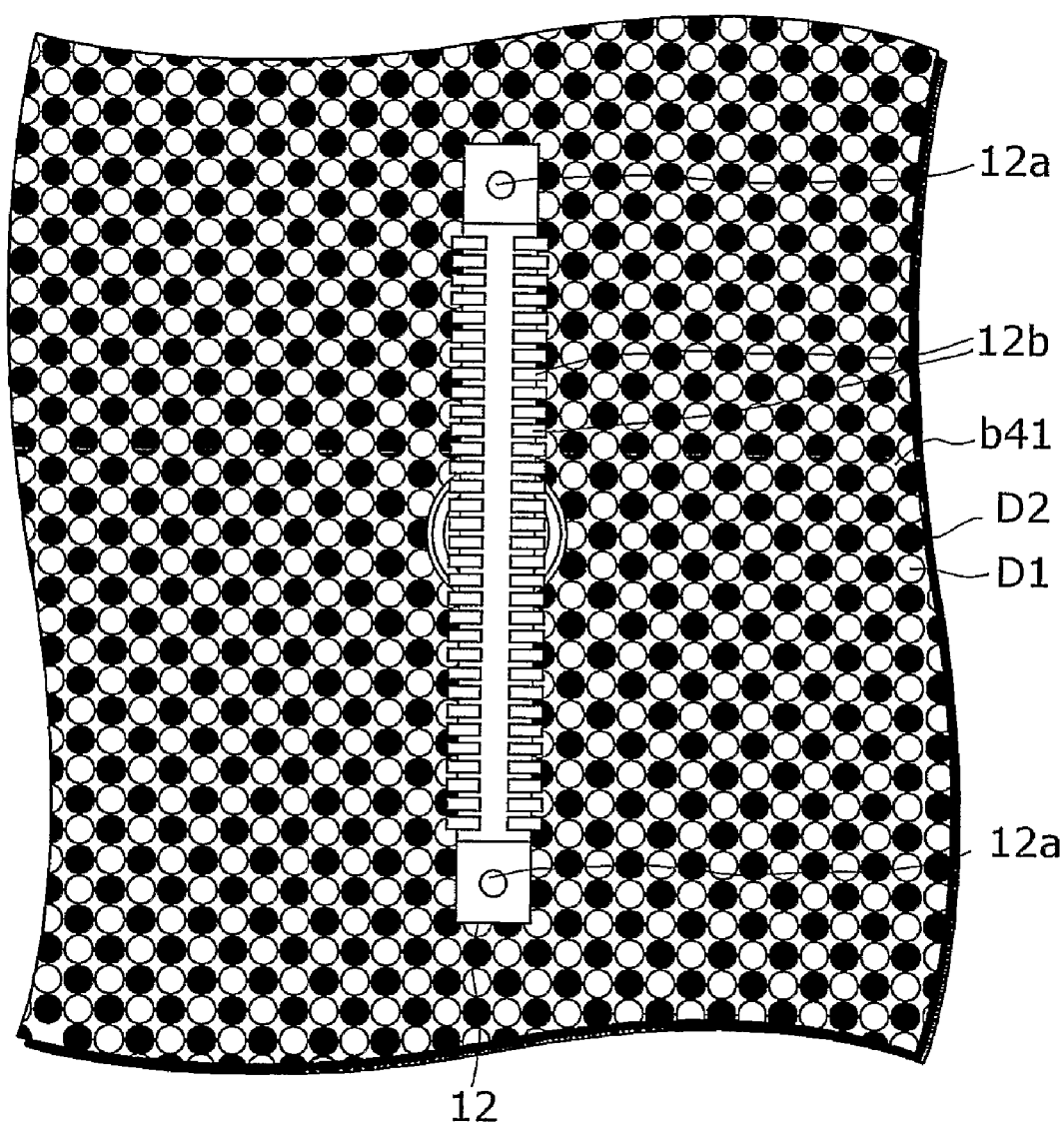
FIG. 30 is a diagram for explaining a state where the component is looked from an inside of a cabinet of the canner body through a glass plate according to the third embodiment of the present invention.

FIG. 30 is a diagram for explaining a state where the component 12 is looked from the inside of the cabinet 211 of the scanner body 210 through the glass plate 212.

As described in the above, by holding the component 12, the electrode plane of the component 12 is seen from the inside of the cabinet 211 through the glass plate 212 without being inclined.

In such a state, the scanner 170B generates a color image of the electrode plane of the component 12 of the scanner 170B.

In other words, the scanner 170B makes the light-emitting diodes D1 and light-emitting diodes D2 on the light-emitting plate b41 emit light, and irradiates red or blue light from above the component 12. The scanner 170B further drives the lightening device in the cabinet 211 and illuminates the electrode plane of the component 12. The imaging device in the cabinet 211 then takes an image of the electrode plane of the component 12 illuminated by the lightening device through the glass plate 212 with the light-emitting plate b41 which emits blue or red light as background.

Figure 31:
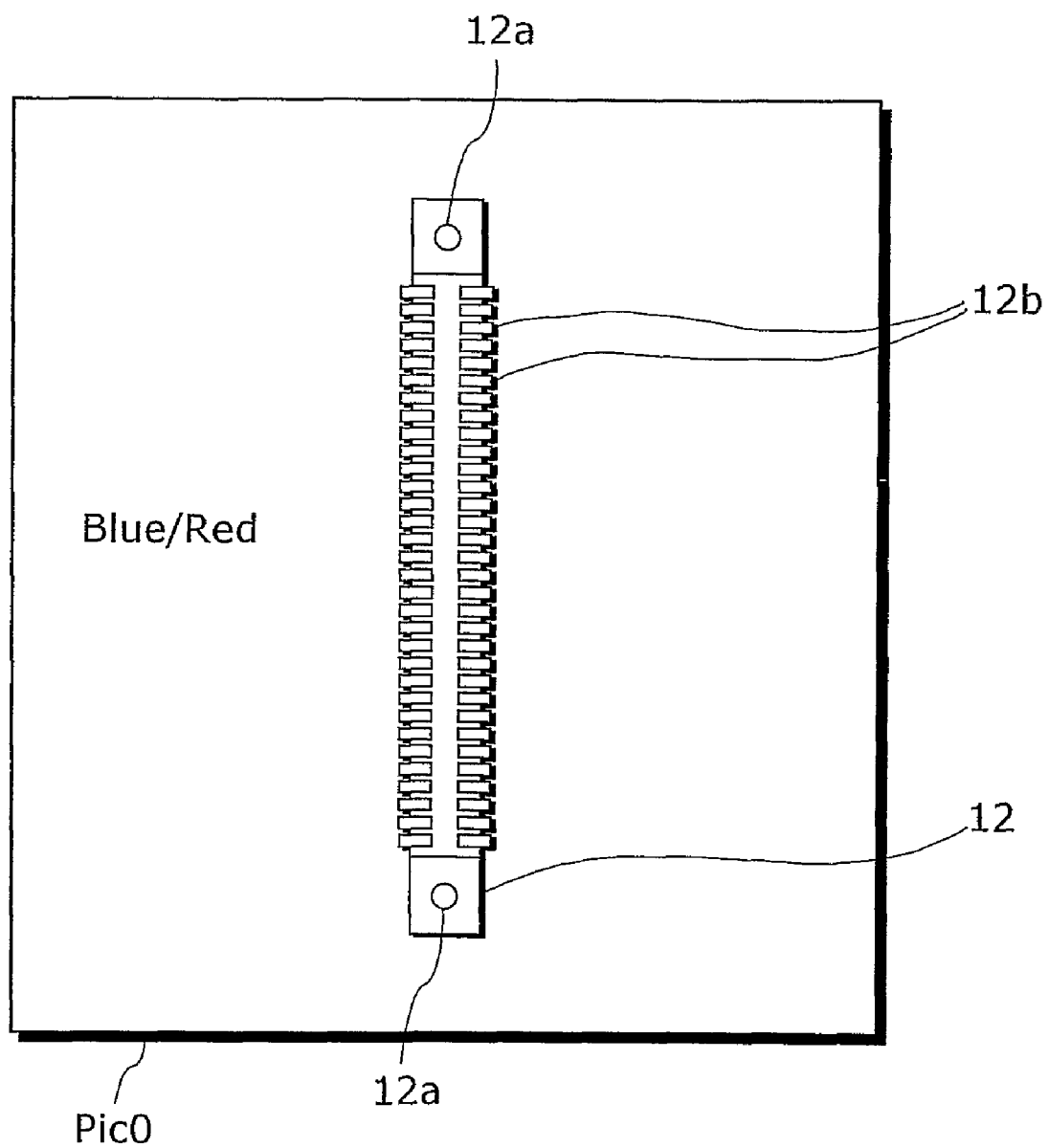
FIG. 31 is a diagram showing a color image generated by the scanner according to the third embodiment of the present invention.

FIG. 31 is a diagram showing a color image generated by the canner 170B according to the present embodiment.

As shown in FIG. 31, in the color image Pic0 generated with blue light emitted from the light-emitting plate b41, the background is shown evenly in vivid blue and the electrode plane of the component 12 is shown without being inclined. Also, in the color image Pic0 generated with red light emitted from the light-emitting plate b41, the background is shown evenly in vivid red and the electrode plane of the component 12 is shown without being inclined.

Accordingly, the scanner 170B in the present embodiment takes an image of the component by irradiating blue or red light from the back of the component and holding the component. Therefore, the color image of the component can be generated by making the background in vivid and consistent blue or red regardless of shapes and sizes of the component, and by preventing the inclination of the component.

As the result, the component automatic teaching apparatus 100B of the present embodiment can generate component teaching data precisely indicating a shape and characteristic dimension of the component from the color image.

It should be noted that whereas the control unit 120A according to the second embodiment is included in the present embodiment, the control unit 120 according to the first embodiment can be used as well.

(Variation)

Here, it is explained about a variation of the component automatic teaching apparatus according to the first embodiment.

The component automatic teaching apparatus according to the present variation is included in the component mounting apparatus which mounts a component on a substrate.

Figure 32:
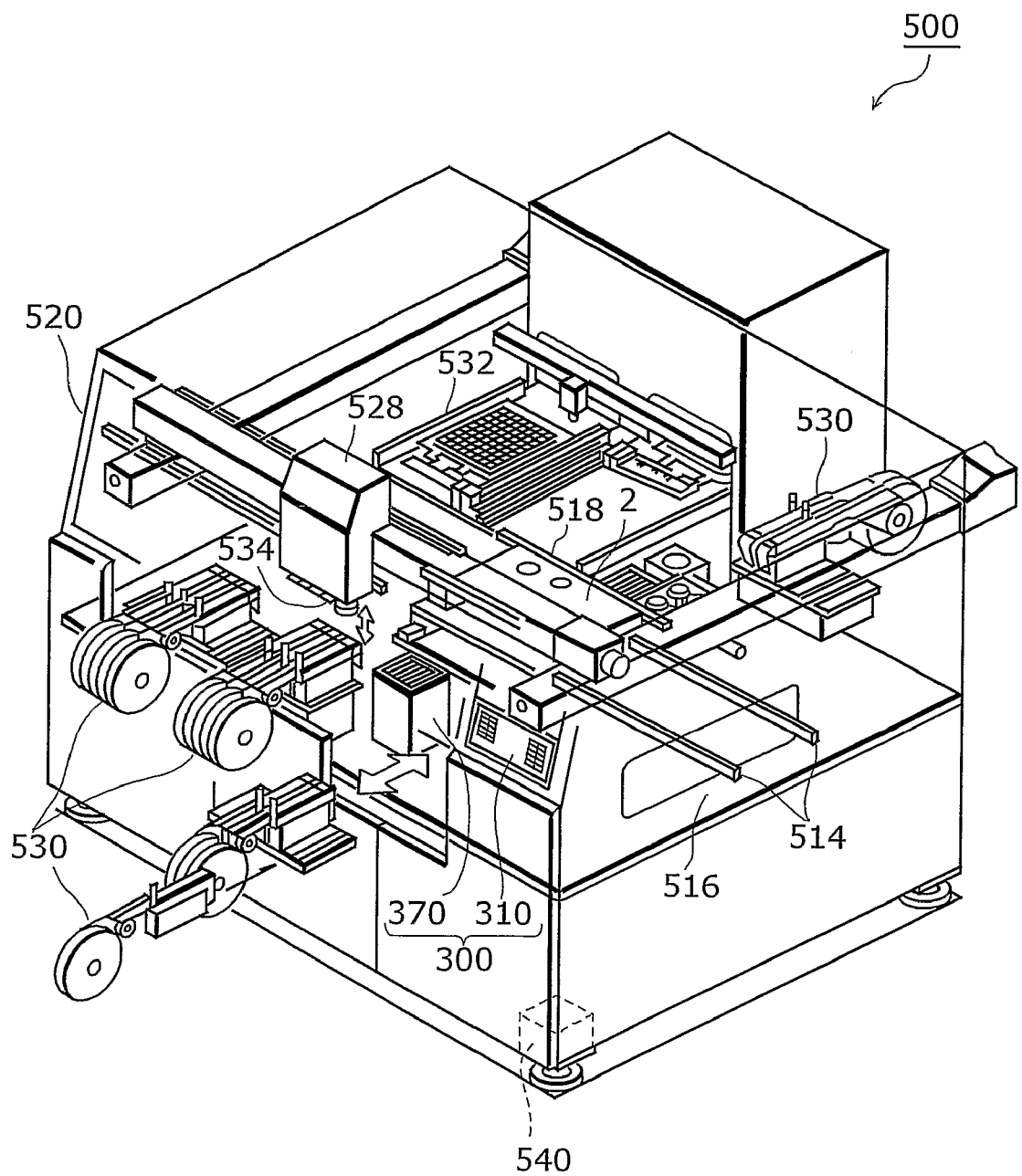
FIG. 32 is an external drawing showing an external view of a component mounting apparatus having a component automatic teaching apparatus according to a variation of the first embodiment.

FIG. 32 is an external drawing showing an external view of the component mounting apparatus including the component automatic teaching apparatus according to the present variation.

The component mounting apparatus 500 includes a guide rail 514 for transferring the substrate 2, a parts feeder 530 which supplies components such as resistance and condenser, a parts tray 532 on which an Integrated Circuit (IC) such as Small Outline Package (SOP) and Quad Flat Package (QFP), and a relatively large component such as a connector is placed, a head 528 which sucks a component supplied from the parts feeder 530 and a component placed on the parts tray 532 and mounts on the substrate 2, a component automatic teaching apparatus 300, and a recognition unit 540 which recognizes a misalignment of the component sucked to the head 528 by referring to the component teaching data generated by the component automatic teaching apparatus 300.

Such component mounting apparatus 500 generates the component teaching data of the component sucked to the head 528 in the component automatic teaching apparatus 300 before mounting the component, takes an image of the component sucked to the head 528 at the time of mounting the component, and recognizes the misalignment of the component sucked to the head 528 using the imaging result and previously generated component teaching data.

The substrate 2 is, in a state placed on the guide rail 514, transferred to a mounting position 518 from a loader unit 516 of the component mounting apparatus 500 by driving a transfer belt that is not shown in a diagram, and transferred to an unloader unit 520 when the component is mounted at the mounting position 518.

The head 528 has suction nozzles 534, each of which sucks a component to its tip, and transfers to a direction along a plane of the substrate 2 by driving a motor and the like that are not shown in the diagram. The component is transferred by such move of the head 528. At the time of generating the component teaching data, the head 528 transfers the component to an imaging position that is described later. On the other hand, at the time of mounting the component, the head 528 first transfers the component to the substrate 2 where has the mounting position 518 after the component is transferred to the imaging position and an image of the component is taken at the imaging position. The head 528 drives the suction nozzle 534 and mounts the component on the substrate 2.

The component automatic teaching apparatus 300 according to the present variation is placed so as to be able to take an image of the component placed at the imaging position. In other words, the component automatic teaching apparatus 300 takes an image of the component sucked to the suction nozzle 534 of the head 528 from the opposite side of the head 528 (from below in FIG. 32).

Figure 33:
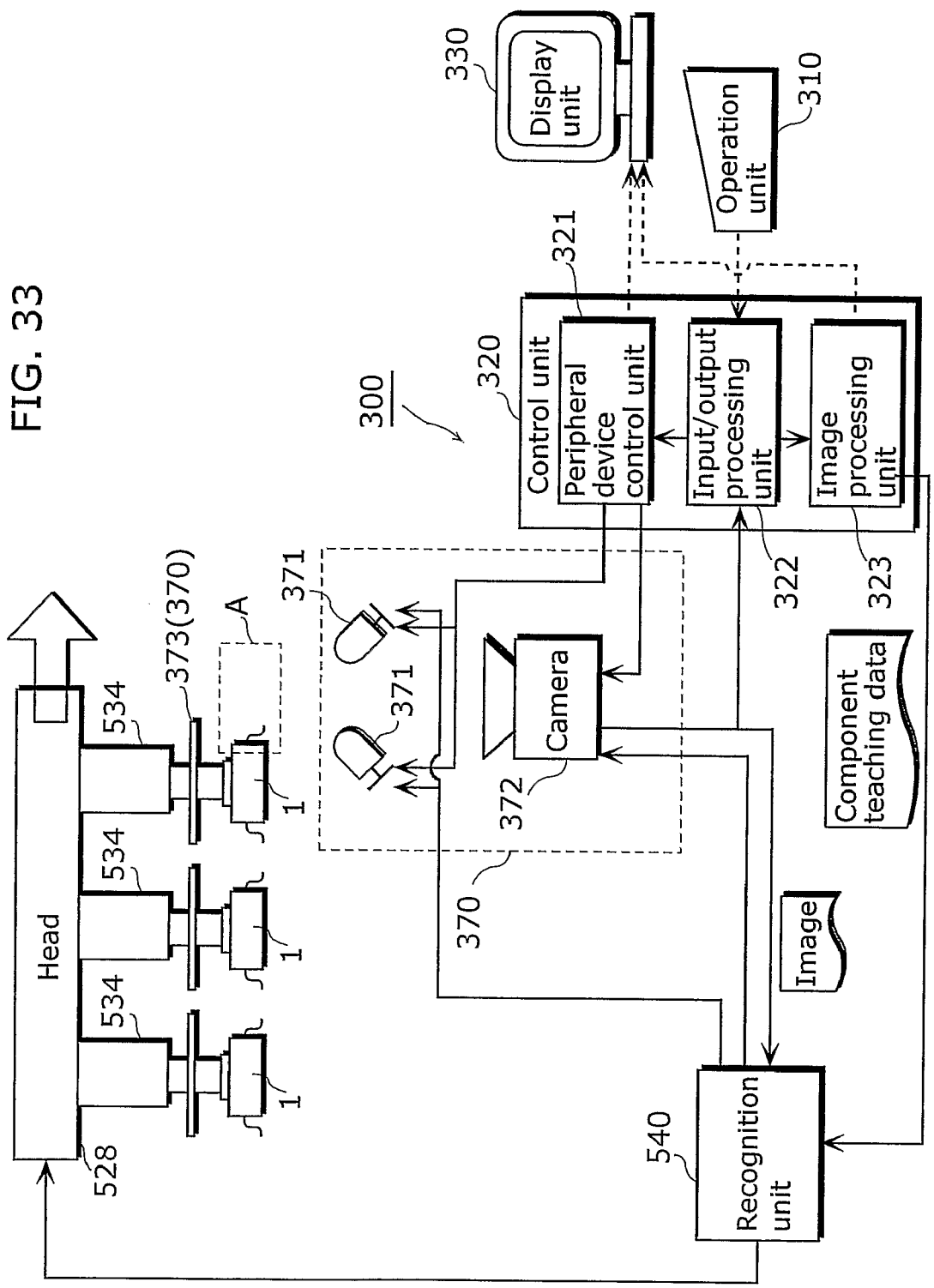
FIG. 33 is a diagram showing a structure of the component automatic teaching apparatus according to the variation of the first embodiment.

FIG. 33 is a diagram showing a structure of the component automatic teaching apparatus 300 according to the present variation.

The component automatic teaching apparatus 300 according to the present variation includes a display unit 330, an operation unit 310, a control unit 320, and further an imaging unit 370 which takes an image of the component 1 sucked by the head 528 instead of the scanner 170 of the component automatic teaching apparatus 100 according to the embodiment.

The display unit 330 and the operation unit 310 according to the present variation respectively have similar functions of the display unit 130 and the operation unit 110 according to the embodiment. The operation unit 310 is placed in the component mounting apparatus 500 so that the operator can operate (refer to FIG. 32) and the display unit 330 is placed near the operation unit 310.

The imaging unit 370 has a camera 372 which takes an image in color, a lighting device 371 which irradiates white light to the component 1 sucked by the head 528, and a background plate 373 attached to the each of the suction nozzles of the head 528. The plane of the background plate 373 on the side of the component 1 is blue or red. If the component 1 to be sucked by the suction nozzle 534 is not bluish, a blue background plate 373 is used for the suction nozzle 534, and if the component 1 to be sucked by the suction nozzle 534 is not reddish, a red background plate 373 is used for the suction nozzle 534.

At the time of generating the component teaching data and mounting the component, such imaging unit 370 takes an image of the component 1 with the background plate 373 as the background when the component 1 sucked by the head 528 is transferred to the imaging position A, and generates a color image of the component 1 with a blue or red background.

The control unit 320 according to the present variation has a peripheral device control unit 321, an input/output processing unit 322 and an image processing unit 323. The peripheral device control unit 321 and the input/output processing unit 322 have similar functions as the peripheral device control unit 121 and the input/output processing unit 122 according to the embodiment. Whereas the image processing unit 323 basically has a function similar to that of the image processing unit 123 according to the embodiment, it further determines a component size as a condition for generating the component teaching data.

FIG. 34 is a screen display diagram showing an example of a screen of which the image processing unit 323 makes the display unit 330 display for determining a generation condition.

The image processing unit 323 makes the display unit 330 display a size column A21 for selecting a component size from a pull-down menu. The operator displays a dimension of the longest side of the component 1 in the size column A21 as a component size by operating the operation unit 310, selects a determination button A6 so as to determine the component size as a generation condition. Further, the image processing unit 323 according to the present variation makes the display unit 330 display a screen shown in FIG. 34 before the imaging unit 370 takes an image of the component 1, and previously determines an electrode type, electrode ground plane shape and a component size as generation conditions.

In the component automatic teaching apparatus 300 according to the present variation, when the component 1 sucked by the suction nozzle 534 of the head 528 is transferred to an imaging position A, the camera 372 of the imaging unit 370 takes an image of the component 1 illuminated with the lightening device 371. Herein, the camera 372 adjusts an angle of an image abased on the component size determined by the image processing unit 323, and takes an image of the component 1 with the image angle. The camera 372 then outputs the color image of the component 1 as the imaging result to the control unit 320. In the case where the blue background plate 373 is attached to the head 528, a color image with blue background is outputted, while in the case where the red background plate 373 is attached to the head 528, a color image with red background is outputted. The component automatic teaching apparatus 300 according to the present variation, as similar in the embodiment, generates a black-and-white grayscale image from the color image taken as described above and generates the component teaching data based on the black-and-white grayscale image and the generation condition.

The recognition unit 540 in the component mounting apparatus 500, for example, is made up of a Central Processing Unit (CPU) which controls each appliance included in the component mounting apparatus 500.

The recognition unit 540 controls the lightening device 371 and the camera 372, and makes the camera 372 take an image of the component 1. The recognition unit 540 then recognizes a misalignment of the component 1 sucked by the suction nozzle 534 of the head 528 based on the component teaching data previously generated by the component automatic teaching apparatus 300 and the color image and black-and-white grayscale image generated by the camera at the time of mounting the component. Specifically, the recognition unit 540 recognizes a misalignment in a direction (horizontal direction) along the suction plane of the component 1 sucked by the suction nozzle 534, and a misalignment in a rotational direction of the component 1 on the suction plane and the misalignment. Following that, the recognition unit 540 drives the head 528 and the suction nozzle 534 so as to resolve the misalignment. As the result, the component 1 is mounted precisely at a predetermined position on the substrate 2.

Such component mounting apparatus 500 has a function of generating component teaching data and a function of mounting a component so that it can recognize the misalignment more precisely than a system which separately has a component automatic teaching apparatus 100 and a component mounting apparatus. In other words, in this system, the scanner 170 which takes an image of the component 1 of the component automatic teaching apparatus 100 differs from a camera which takes an image of the component 1 sucked to the head of the component mounting apparatus. On the other hand, in the component mounting apparatus 500, the camera 372 used for generating the component teaching data is identical to the camera 372 which takes an image of the component 1 sucked by the suction nozzle 534. Therefore, generation of errors caused because of the different imaging units can be prevented.

It should be noted that in the variation, while the component mounting apparatus 500 generates the component teaching data before mounting a component, and recognizes the misalignment of the component 1 using the component teaching data and the image taken by the camera 372, the image generation processing according to the embodiment is applied to the imaging of an image at the time of recognizing the misalignment. In other words, when the camera 372 takes an image of the component 1 transferred to an imaging position A in color, the image processing unit 323 of the control unit 320 generates a black-and-white grayscale image of the component 1 from the color image at that point. The recognition unit 540 then recognizes the misalignment of the component 1 sucked by the head 528 at the time of mounting the component by detecting an outline of the component 1 from the black-and-white grayscale image and measuring a characteristic dimension. Even in such case, an effect similar to the above can be obtained.

Further, the image processing unit 323 may have a function of the recognition unit 540.

Furthermore, in the variation, the component mounting apparatus 500 has the component automatic teaching apparatus 300 which has a function similar to that of the component automatic teaching apparatus 100 in the first embodiment. However, the component mounting apparatus may have a component automatic teaching apparatus having a function similar to that of the component automatic teaching apparatus 100A according to the second embodiment.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A method of generating an image of a component according to the present invention has an effect that a shape of the component can be distinguished, for example, it is applicable to a component automatic teaching apparatus which teaches an operator a characteristic dimension and the like of an electronic component from an image of the electronic component and to a component mounting apparatus which recognizes a misalignment of the component based on the teaching result.

The invention claimed is:

1. A component image generation method of generating an image of a component that is used for identifying a characteristic of the component to be mounted on a substrate, said method comprising:

taking an image of the component in color; and converting the color image into a grayscale image in which an outline of the component or an outline of an electrode of the component is shown in grayscale, wherein in said taking of the color image, a first color image of the component is taken so as to have a background in a first monochrome color, wherein in said converting, the first color image is converted into the grayscale image in which the background is shown in black or white and an outline of the component is shown in grayscale, and wherein said component image generation method further comprises:

judging whether or not a contrast between the component and background in the grayscale image satisfies a predetermined standard;

taking a second color image of the component so as to have the background in a second monochrome color that is different from the first monochrome color, in the case where it is judged that the contrast does not satisfy the standard; and converting the second color image into a grayscale image in which the background is shown in black or white and the outline of the component is shown in grayscale.

2. The component image generation method according to claim 1, wherein one of the first monochrome color and the second monochrome color is blue and the other is red.

3. The component image generation method according to claim 1, wherein said judging includes calculating, for each unit area of the grayscale image, a sum of grayscale values indicated by respective pixels included in a unit area, and judging that the contrast satisfies the predetermined standard when the calculated sum of the grayscale values in each unit area is equivalent to or greater than a threshold.

4. The component image generation method according to claim 1, further comprising:

extending the grayscale range of the first converted grayscale image in the case where it is judged that the contrast satisfies the standard; and extending the grayscale range of the second converted grayscale image in the case where it is judged that the contrast does not satisfy the standard.

* * * * *